United States Patent
Fieldman

(10) Patent No.: US 10,467,918 B1
(45) Date of Patent: Nov. 5, 2019

(54) AWARD INCENTIVES FOR FACILITATING COLLABORATIVE, SOCIAL ONLINE EDUCATION

(71) Applicant: Study Social, Inc., Gainesville, FL (US)

(72) Inventor: Ethan Fieldman, Gainesville, FL (US)

(73) Assignee: STUDY SOCIAL, INC., Gainesville, FL (US)

( * ) Notice: Subject to any disclaimer, the term of this patent is extended or adjusted under 35 U.S.C. 154(b) by 0 days.

(21) Appl. No.: 16/140,736

(22) Filed: Sep. 25, 2018

Related U.S. Application Data

(63) Continuation of application No. 14/659,436, filed on Mar. 16, 2015, which is a continuation-in-part of application No. 14/641,840, filed on Mar. 9, 2015, now Pat. No. 10,126,927, application No. 16/140,736, which is a continuation-in-part of application No. 14/216,688, filed on Mar. 17, 2014, now abandoned.

(60) Provisional application No. 62/076,049, filed on Nov. 6, 2014, provisional application No. 61/954,419, filed on Mar. 17, 2014, provisional application No. 61/799,332, filed on Mar. 15, 2013.

(51) Int. Cl.
G09B 5/10 (2006.01)

(52) U.S. Cl.
CPC ..................... G09B 5/10 (2013.01)

(58) Field of Classification Search
None
See application file for complete search history.

(56) References Cited

U.S. PATENT DOCUMENTS

| | | | |
|---|---|---|---|
| 6,397,036 B1 | 5/2002 | Thean | |
| 6,652,287 B1* | 11/2003 | Strub | G09B 5/00 434/322 |
| 6,807,566 B1 | 10/2004 | Bates | |
| 7,050,753 B2 | 5/2006 | Knutson | |
| 7,155,157 B2 | 12/2006 | Kaplan | |
| 7,467,947 B2 | 12/2008 | Sperle | |
| 7,493,396 B2 | 2/2009 | Alcorn | |
| 8,606,792 B1 | 12/2013 | Jackson | |
| 8,769,417 B1 | 7/2014 | Robinson | |
| 8,825,759 B1 | 9/2014 | Jackson | |
| 9,307,035 B1 | 4/2016 | Berentey | |
| 9,740,785 B1* | 8/2017 | Robinson | G06F 16/9535 |
| 2003/0216982 A1* | 11/2003 | Close | G06Q 10/107 705/35 |
| 2006/0046239 A1* | 3/2006 | Allen | G09B 7/00 434/353 |
| 2006/0238379 A1* | 10/2006 | Kimchi | G01C 21/26 340/995.1 |
| 2007/0092859 A1* | 4/2007 | Watts | G09B 5/00 434/322 |

(Continued)

OTHER PUBLICATIONS

U.S. Appl. No. 14/659,436, Feldman, filed Mar. 16, 2015.

(Continued)

*Primary Examiner* — Eddy Saint-Vil
*Assistant Examiner* — William D Ermlick
(74) *Attorney, Agent, or Firm* — Beyer Law Group LLP

(57) ABSTRACT

Various aspects disclosed herein are directed to Online Education techniques and award incentives for facilitating collaborative, social online education.

9 Claims, 23 Drawing Sheets

(56) References Cited

U.S. PATENT DOCUMENTS

| | | | |
|---|---|---|---|
| 2009/0070197 A1* | 3/2009 | Ermolli | G06Q 10/00 705/7.29 |
| 2010/0279264 A1* | 11/2010 | Barazanji | G06Q 10/10 434/322 |
| 2011/0212430 A1* | 9/2011 | Smithmier | G09B 5/06 434/322 |
| 2012/0116982 A1* | 5/2012 | Yoshida | G06Q 30/016 705/304 |
| 2012/0156668 A1* | 6/2012 | Zelin | G09B 5/12 434/362 |
| 2013/0006882 A1* | 1/2013 | Galliani | G06Q 30/02 705/319 |
| 2013/0046826 A1* | 2/2013 | Stanton | G06Q 10/10 709/204 |
| 2013/0231996 A1* | 9/2013 | Chirita | H04L 67/306 705/14.31 |
| 2013/0297545 A1* | 11/2013 | Bierner | G06F 17/2775 706/46 |
| 2014/0059582 A1* | 2/2014 | Knowles | G06Q 10/10 725/24 |
| 2014/0101068 A1* | 4/2014 | Gidugu | G09B 7/02 705/327 |
| 2014/0236858 A1* | 8/2014 | Abel | G06Q 30/0282 705/347 |
| 2014/0244560 A1* | 8/2014 | Mohanty | G06N 5/02 706/46 |
| 2014/0255895 A1* | 9/2014 | Shaffer | G09B 7/02 434/350 |
| 2014/0272895 A1 | 9/2014 | Feistritzer | |
| 2014/0274386 A1* | 9/2014 | Ault | G09B 5/08 463/31 |
| 2014/0279996 A1* | 9/2014 | Teevan | G06F 16/38 707/706 |
| 2014/0295384 A1 | 10/2014 | Nielson | |
| 2014/0349272 A1 | 11/2014 | Kutty | |
| 2014/0351257 A1* | 11/2014 | Zuzik | H04L 67/10 707/740 |
| 2015/0032737 A1 | 1/2015 | Badenes | |
| 2015/0056597 A1* | 2/2015 | Kutty | G09B 7/08 434/350 |
| 2015/0072335 A1 | 3/2015 | Pedanekar | |
| 2015/0079575 A1 | 3/2015 | Couch | |
| 2015/0095267 A1* | 4/2015 | Behere | G06F 16/3329 706/11 |
| 2015/0121246 A1 | 4/2015 | Poore | |
| 2015/0127340 A1 | 5/2015 | Epshteyn | |
| 2015/0209677 A1* | 7/2015 | O'Brien | A63F 13/792 463/25 |
| 2015/0220580 A1* | 8/2015 | Pitsos | G06F 16/36 707/690 |
| 2015/0262189 A1 | 9/2015 | Vergeer | |
| 2015/0279225 A1 | 10/2015 | Barber | |
| 2015/0283455 A1 | 10/2015 | Nova | |
| 2015/0339941 A1 | 11/2015 | Lu | |
| 2016/0012739 A1 | 1/2016 | Jafari | |
| 2016/0148524 A1* | 5/2016 | Pulido | G09B 7/00 434/353 |
| 2016/0171900 A1* | 6/2016 | Allen | G09B 7/02 434/322 |
| 2016/0179899 A1 | 6/2016 | Lim | |
| 2016/0314527 A1 | 10/2016 | Rosenberg | |
| 2017/0270823 A1 | 9/2017 | Nielson | |
| 2017/0337837 A1* | 11/2017 | Roy | H04L 12/1831 |
| 2018/0005544 A1* | 1/2018 | Molenje | G09B 19/0038 |
| 2018/0150747 A1* | 5/2018 | Bastide | G06F 17/2785 |

OTHER PUBLICATIONS

Pasadena City College; Feb. 2012; http://!online.pasadena.edu/faculty/files/2012/02/Online-Syllabus-Example-CANVAS-New- Login.pdf.

U.S. Office Action dated Jul. 18, 2017 from U.S. Appl. No. 14/659,436.

U.S. Office Action dated Mar. 30, 2018 from U.S. Appl. No. 15/095,478.

U.S. Office Action dated Apr. 25, 2018 from U.S. Appl. No. 14/659,436.

* cited by examiner

Check all that apply

Clear All

Using Algebra Nation
- Testing/EOC
- Technology Tips
- Student Engagement
- Flipped Classroom
- Blended Instruction
- Differentiated Instruction
- Bootcamp

— 1910

Common Core Mathematical Practices
- Mathematical Practice 1
- Mathematical Practice 2
- Mathematical Practice 3
- Mathematical Practice 4
- Mathematical Practice 5
- Mathematical Practice 6
- Mathematical Practice 7
- Mathematical Practice 8

— 1920

Algebra Content
- Pre-Algebra
- Sets and Venn Diagrams
- Relations and Functions
- Solving for X
- Real World Equations
- Lines: Slope, Intercepts, Graphing
- Lines: Equations,
- Parallel/Perpendicular, Inequalities
- Systems and Equations
- Monomials and Radicals
- Polynomial Operations
- Factoring
- Quadratics

Show only posts tagged:
Clear All

Using Algebra Nation
- Testing/EOC
- Technology Tips ← 2111
- Student Engagement
- Flipped Classroom
- Blended Instruction
- Differentiated Instruction
- Bootcamp

Common Core Mathematical Practices
- Mathematical Practice 1
- Mathematical Practice 2
- Mathematical Practice 3
- Mathematical Practice 4
- Mathematical Practice 5 ← 2113
- Mathematical Practice 6
- Mathematical Practice 7
- Mathematical Practice 8

Algebra Content
- Pre-Algebra
- Sets and Venn Diagrams
- Relations and Functions
- Solving for X
- Real World Equations
- Lines: Slope, Intercepts, Graphing
- Lines: Equations
- Parallel/Perpendicular, Inequalities
- Systems and Equations
- Monomials and Radicals
- Polynomial Operations
- Factoring
- Quadratics

AWARD INCENTIVES FOR FACILITATING COLLABORATIVE, SOCIAL ONLINE EDUCATION

RELATED APPLICATION DATA

This application is a continuation application, pursuant to the provisions of 35 U.S.C. § 120, of prior U.S. patent application Ser. No. 14/659,436 titled "AWARD INCENTIVES FOR FACILITATING COLLABORATIVE, SOCIAL ONLINE EDUCATION" by Fieldman, filed on Mar. 16, 2015, which in turn is a continuation-in-part application of prior U.S. patent application Ser. No. 14/216,688 titled "METHODS FOR ONLINE EDUCATION" by Fieldman, filed on Mar. 17, 2014, which claims benefit of U.S. provisional application No. 61/799,332, titled "PROVISION OF ONLINE EDUCATION", naming Ethan Fieldman as inventor, and filed Mar. 15, 2013. Each of these applications is incorporated herein by reference in its entirety and for all purposes.

U.S. patent application Ser. No. 14/659,436 is also a continuation-in-part application, pursuant to the provisions of 35 U.S.C. § 120, of prior U.S. patent application Ser. No. 14/641,840 titled "COLLABORATIVE, SOCIAL ONLINE EDUCATION AND WHITEBOARD TECHNIQUES", by Fieldman, filed on Mar. 9, 2015, which claims benefit, pursuant to the provisions of 35 U.S.C. § 119, of: U.S. provisional application Nos. 62/076,049, titled "COLLABORATIVE, SOCIAL ONLINE EDUCATION AND WHITEBOARD TECHNIQUES", by Fieldman, filed Nov. 6, 2014; and 61/954,419, titled "PROVISION OF ONLINE EDUCATION", by Fieldman, filed Mar. 17, 2014. Each of these applications is incorporated herein by reference in its entirety and for all purposes.

BACKGROUND

The present disclosure relates to online education. More particularly, the present disclosure relates to various techniques for award incentives for facilitating collaborative, social online education.

Online education is increasing in popularity and user participation. The strength and appeal of online education is that users do not have to be in the same location, either physically or academically, in order to collaborate and learn. However, this strength is undermined by existing limitations in online learning platforms.

Despite advances in online education techniques, it remains problematic to engage in discussions and/or collaborations focused on non-textual material in online discussion forums, chat rooms, discussion walls, etc. For example, currently, there are no easy or convenient ways for users to discuss math and science topics in the traditional online chat room environments. Similarly, there are no easy or convenient ways for users to illustrate mathematical and scientific concepts, which include but are not limited to writing complex equations, drawing graphs, drawing molecular structures, etc. There is also no easy, user-intuitive method of capturing a problem or image in a textbook and sharing and discussing the problem or image on the online discussion forum. There are also issues with users attempting to type symbols or describe images that do not adequately communicate the scenario, leading to problematic learning situations. Additionally, copying and/or reproduction errors may be introduced when users attempt to type out a problem. Such issues are detrimental to the online learning experience, particularly in situations involving concepts that need to be illustrated in order to be understood and/or discussed.

BRIEF DESCRIPTION OF THE DRAWINGS

FIGS. 6-10, 10A, 11-14, and 16-22 illustrate example screenshots of various GUIs which may be used for facilitating activities relating to one or more of the online social education aspects disclosed herein.

DETAILED DESCRIPTION OF EXAMPLE EMBODIMENTS

Overview

Figure 1:
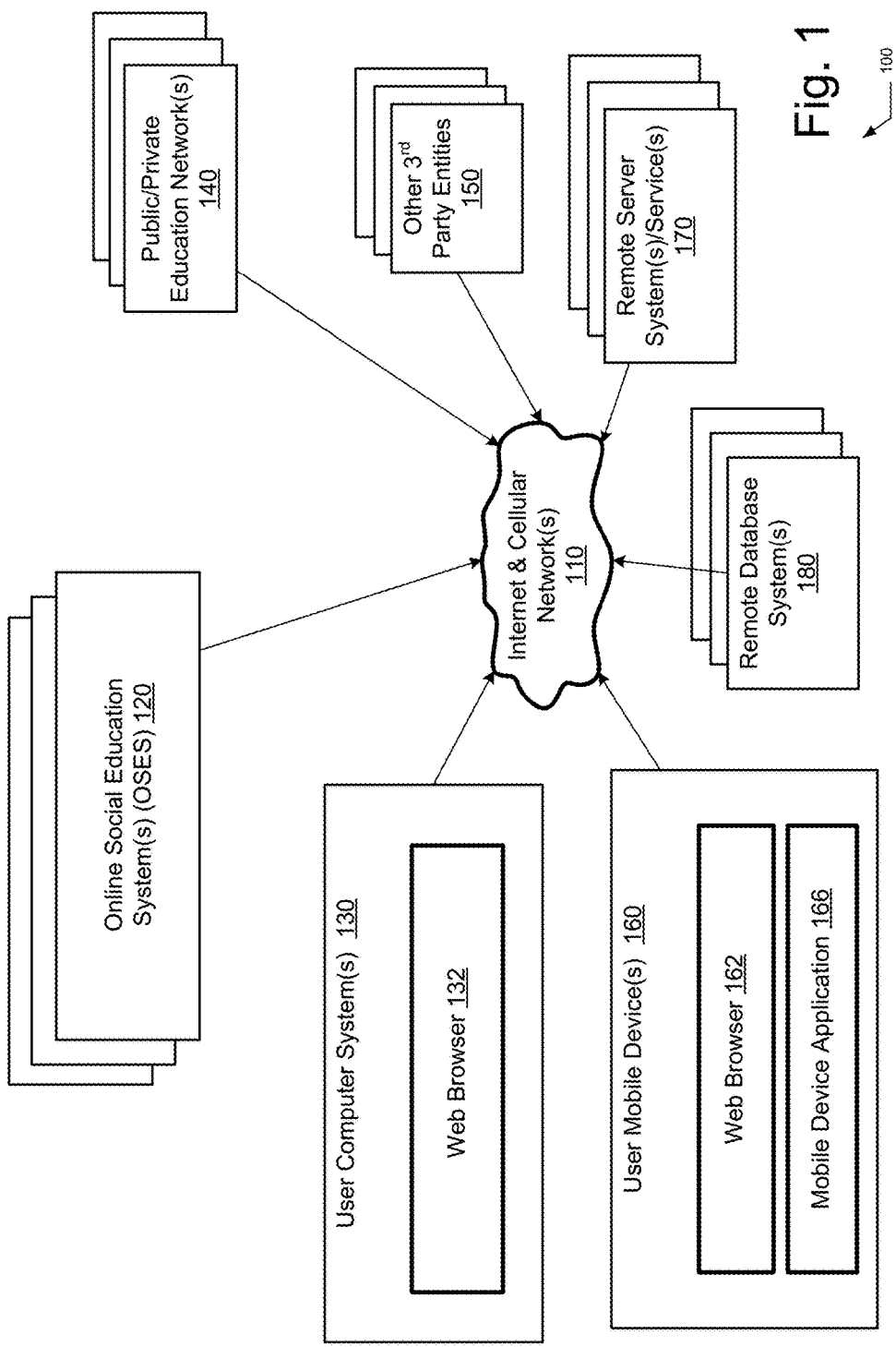
FIG. 1 illustrates a simplified block diagram of a specific example embodiment of an Online Social Education Network (OSEN) or Online Social Education System (OSES) which may be implemented via a computerized data network.

Various aspects described or referenced herein are directed to different methods, systems, and computer program products relating to online education techniques, functions and features.

One aspect disclosed herein is directed to different methods, systems, and computer program products for facilitating collaborative, online education via a computer network. In at least one embodiment, various method(s), system(s) and/or computer program product(s) may be operable to cause at least one processor to execute a plurality of instructions for: providing remote user access to a collaborative, online educational discussion medium ("OEDM"); generating a student graphical user interface ("Student GUI") for use by a school student user accessing the OEDM; generating a teacher graphical user interface ("Teacher GUI") for use by a school teacher user accessing the OEDM; generating a Study Expert graphical user interface ("Study Expert GUI") for use by a Study Expert user accessing the OEDM; configuring the Study Expert GUI to display a first post from a first student user which has been posted at the OEDM; configuring the Study Expert GUI to include award incentive functionality for enabling the Study Expert to optionally award the first student user with a selected award point value in connection with the first post; configuring the Study Expert GUI to display a first award option for awarding the first student user with a first award point value in connection with the first post; configuring the Study Expert GUI to display a second award option for awarding the first student user with a second award point value in connection with the first post; and configuring the Study Expert GUI to enable the Study Expert to select one of the displayed award options for causing the selected award point value to be awarded to the first student user.

Additional method(s), system(s) and/or computer program product(s) may be further operable to cause at least one processor to execute additional instructions for: calculating a current award score for the first student user, wherein the current award score represents a cumulative total of award points awarded to the first student user at the OEDM over a first time period; receiving instructions from the Study Expert to award the first student user with a specific award point value; and updating the first student user's current award score by adding the specific award point value. In some embodiments, the first award point value is different from the second award point value.

Additional method(s), system(s) and/or computer program product(s) may be further operable to cause at least one processor to execute additional instructions for causing the at least one processor to execute instructions for preventing award points from being awarded to selected groups of users of the OEDM.

Additional method(s), system(s) and/or computer program product(s) may be further operable to cause at least one processor to execute additional instructions for preventing award points from being awarded to school teacher users of the OEDM.

Additional method(s), system(s) and/or computer program product(s) may be further operable to cause at least one processor to execute additional instructions for preventing student users from awarding award points to users of the OEDM.

Additional method(s), system(s) and/or computer program product(s) may be further operable to cause at least one processor to execute additional instructions for preventing teacher users from awarding award points to users of the OEDM.

Additional method(s), system(s) and/or computer program product(s) may be further operable to cause at least one processor to execute additional instructions for: receiving instructions from the Study Expert to award the first student user with the first award point value in connection with the first post; distributing the first award point value to the first student user; and preventing awarding of additional award points to the first student user in connection with the first post.

Additional method(s), system(s) and/or computer program product(s) may be further operable to cause at least one processor to execute additional instructions for: receiving instructions from the Study Expert to award the first student user with the first award point value in connection with the first post; electronically distributing the first award point value to the first student user; preventing awarding of additional award points to the first student user in connection with the first post; configuring the Study Expert GUI to display a second post from a first student user which has been posted at the OEDM; configuring the Study Expert GUI to include award incentive functionality for enabling the Study Expert to optionally award the first student user with a selected award point value in connection with the second post; receiving instructions from the Study Expert to award the first student user with a second award point value in connection with the second post; electronically distributing the second award point value to the first student user; and preventing awarding of additional award points to the first student user in connection with the second post.

Another aspect disclosed herein is directed to different methods, systems, and computer program products for facilitating collaborative, online education via a computer network. In at least one embodiment, various method(s), system(s) and/or computer program product(s) may be operable to cause at least one processor to execute a plurality of instructions for: providing remote user access to a collaborative, online educational discussion medium ("OEDM"); configuring the OEDM to include award incentive functionality for enabling selected users to be awarded with award points in accordance with a set of award rules; accessing the set of award rules defining award criteria relating to awarding of award points to users of the OEDM, wherein the award criteria includes a first set of award criteria defining the awarding of a first award point value for user activities at the OEDM which satisfy a first set of events/conditions, and wherein the award criteria includes a second set of award criteria defining the awarding of a second award point value for user activities at the OEDM which satisfy a second set of events/conditions; identifying a first event at the OEDM relating to a first action performed by a first student user; generating a Study Expert graphical user interface ("Study Expert GUI") for use by a Study Expert user accessing the OEDM; configuring the Study Expert GUI to display information relating to the first event; and configuring the Study Expert GUI to include award functionality for enabling the Study Expert to optionally award the first student user with a selected award point value in connection with the first event, wherein the awarding of the selected award point value is based, at least partially, upon the set of award rules.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

As described in greater detail herein, various aspects of the present application describe different techniques which may be used to improve online education techniques, and to overcome at least a portion of the issues relating to online education and online learning, such as those described above. More specifically, various different techniques are described herein for improving online education techniques by enabling users to communicate and collaborate on online social education platforms using images, graphs, drawings, etc. Such techniques significantly enhance the online learning experience, and provide a heretofore missing piece to online learning platforms. For example, using the various image posting techniques described herein, users can now easily show tutors, teachers, peers, etc. the exact problem they are working on, and communicate regarding the problem without dealing with how to express the problem itself. These techniques are suitable for a wide range of online learning environments, including, but not limited to, facilitating 1-on-1 tutoring scenarios, small group interactions (in which a small group of peers exchange ideas, or, a small group of students are led by a teacher), and universal group learning (in which discussion area is not segmented to only include a subset of users, but rather, all who visit the area can see the ongoing discussion.) This solution may also be extended beyond the online realm and into real-world classrooms. For example, using the various image posting techniques described herein, students in real-world (physical) classrooms may capture images and/or compose text (e.g., relating to potential solutions, comments, and/or questions) using their mobile devices, and may easily transmit or convey such images/text (e.g., via email, mobile app, text message, MMS message, chat, etc.) to teachers, without a teacher having to visit each individual, desk, or group of students. In this way, students can contribute ideas even if they are hesitant to verbally express ideas simply by, for instance, texting in a graphed solution.

FIG. 1 illustrates a simplified block diagram of a specific example embodiment of an Online Social Education Network (OSEN) or Online Social Education System (OSES) 100, which may be implemented via a computerized data network. As described in greater detail herein, different embodiments of Online Social Education Systems may be configured, designed, and/or operable to provide various different types of operations, functionalities, and/or features generally relating to Online Education technology. More specifically, the Online Education (OE) techniques described herein utilize social learning and technological breakthroughs to construct and stage a vibrant online learning system for students, teachers, parents, and educators. These Online Education techniques help to foster a dynamic online education environment via social interaction (e.g., nonlinear, hands-on, effective and fun).

For example, one aspect of the Online Social Education System (OSES) 100 is directed to an online, "Interactive Study Wall", where students can ask/post questions and receive answers from peers (e.g., other students), teachers, and/or other educators (such as, for example, Study Experts). The OE System may include functionality for enabling participants to post questions/responses via drawing graphs, inserting equations, taking/uploading photos and/or videos. In at least one embodiment, Study Experts may function as Interactive Study Wall moderators, and monitor the interactions in real time and/or non-real time, answering questions and reviewing posted threads to ensure the accuracy of the posted replies/responses.

In at least one embodiment, the Interactive Study Wall is configured or designed to encourage students to feel free to ask even the simplest of questions. The discussions which these questions spark, and the answers/responses they elicit are individualized, yet also universally applicable (e.g., a response describing a solution to a math problem).

According to different embodiments, multiple different instances of online Interactive Study Walls may be instantiated (e.g., concurrently instantiated) for different topic or fields of study such as, for example, one or more of the following (or combinations thereof):
Algebra;
Geometry;
Physics;
Accounting;
Chemistry;
etc.

In at least one embodiment, an Interactive Study Wall may be configured or designed to be completely searchable and transparent. For example, in one embodiment, a specific Interactive Study Wall (e.g., Algebra Wall) may be accessible to all students and teachers of a given district or region (such as, for example, school district, county, state, country etc.). For example, a question asked by a student in Miami, Fla. might prove useful to a student in Boulder, Colo., and a teacher or Study Expert in Phoenix, Ariz. may use the Interactive Study Wall to provide assistance to students in Dallas, Tex.

In at least some embodiments, Interactive Study Wall may be configured as a shared resource for facilitating student and/or teacher communications across school, district, state, country, etc., thereby creating a substantially collaborative and open environment among all users, while simultaneously reducing security threats to children. In at least some embodiments, the Online Social Education System may be configured or designed to enable various collaborative, non-hierarchical Interactive Study Wall features. For example, the Interactive Study Wall may be configured or designed to:

Enable teachers to use the Interactive Study Wall to interact with their students and vice-versa.
Enable students to use the Interactive Study Wall to interact with other students, such as, for example, students who are learning or studying similar educational curriculum or similar educational standards.
Enable students and Study Experts to use the Interactive Study Wall to interact with each other.
Etc.

In some embodiments, manual and/or automated mechanisms may be provided to identify and filter out unrelated, negative or derogatory comments/responses. Additionally, unlike most existing social networks and online forums, in at least some embodiments, the Interactive Study Wall may be configured or designed to prohibit personal or private messaging (e.g., between or among peers). This helps to foster a publically collaborative, socially interactive environment among all users. Further, in at least some embodiments, the Interactive Study Wall may be configured or designed to prohibit or prevent students (and/or other users) from accessing other users' pictures and personal profiles. For example, participants' profile pages may be blocked, thereby preventing access participants' personal information.

Additionally the Interactive Study Wall may be continuously monitored (e.g., via automated and/or human mechanisms), and may be configured or designed to provide notification to Study Experts (e.g., moderators) whenever a question and/or response is posted on an Interactive Study Wall.

In at least one embodiment, students may be allocated points or awards or incentives for posting questions and/or for answering peers' questions on the Interactive Study Wall. In the following embodiments, the awards are called "Karma points", but do not necessarily need to be named so. For example, in one embodiment, the Interactive Study Wall may include functionality for enabling Study Experts or moderators to award students with differing amounts of "Karma points" for asking questions and/or answering peers' questions. In some embodiments, Karma points may be shown next to a student's name, and a "Karma Leader Board" may be maintained and automatically updated to track, for example, the top n (e.g., n=5) karmic leaders in a specified group, region or district. Accumulated Karma points may be redeemable for physical (e.g., real-world) prizes. For example, according to different embodiments, the Online Social Education System may award incentive prizes to various different entities such as, for example: students, teachers, schools, grades, classes, school districts, regions, etc. In some embodiments, the Interactive Study Wall award system may be configured or designed to provide or enable one or more of the following features (or combinations thereof):

Identifying and assigning specific roles to certain persons as administrators, teachers, Study Experts, etc.
Enabling persons (e.g., administrators, Study Experts, etc.) to monitor study wall posts and allocate or distribute awards/points to users based on perceived effort of user and on helpfulness of user's comment(s)/post(s).
Preventing awards/points from being allocated or distributed to users who post or give away answers.
Prevent awards/points from being allocated or distributed to users who engage in cheating.
Provide mechanisms for punishing users who engage in cheating.
Deduct points from users who give away the answer(s), provide too much help, and/or engage in cheating.

According to different embodiments, at least some Online Social Education System(s) may be configured, designed, and/or operable to provide additional features, advantages and/or benefits and/or may be operable to initiate, and/or enable various different types of operations, functionalities, and/or features, such as, for example, one or more of the following (or combinations thereof):

Features relating to Personalization on of Wall/Adaptive Learning/Interactive Discussion Forums
Discussion boards may be automatically and dynamically personalized dependent on the needs and/or interests of user/viewer.
Automated Adaptive Learning and Personalization of User's Interactive Study Wall. In at least one embodiment, this may include showing specific posts to specific students (e.g., based on level of student, student's district, school, course enrollment, state or national standards associated with the student's needs, etc.). In some embodiments the automated adaptive learning and personalization of a user's Interactive Study Wall may be based, at least partially, posts which the user has "liked". In this way, the Online Social Education System is able to dynamically learn what subject matter a student like, and may dynamically learn or determine the educational curriculum levels: (1) in which the student has demonstrated an adequate understanding or proficiency of specific subject matter, and (2) in which the student has not yet demonstrated an adequate understanding or proficiency of specific subject matter. For example, in one embodiment, the Online Social Education System may evaluate the student based on his or her performance on practice tool or test, and may use the evaluation results to dynamically select, modify, and/or filter selected posts which are displayed on the user's personalized Interactive Study Wall. For example, if the Online Social Education System determines that a given user is less proficient in nonlinear functions, the system may dynamically filter the posts displayed on the user's Interactive Study Wall to cause more posts relating to nonlinear functions to be displayed on the user's Interactive Study Wall.

In some embodiments, may also be based on "pre-test" that asks students to self-assess their confidence level on given problems. In some embodiments, may also be based on "self-assessment" such as, for example, student checking off what they understand/don't understand.

Interactive Study Wall users can mark posts as "high/medium/low" or "conceptual" vs. "skills-focused" to identify the perceived level of difficulty or complexity with a given post, which may be shared with other users, and may also be utilized by the Online Social Education System.

In this way, the Online Social Education System may improve some aspects of students' academic performance and, may create a sense of connectedness that promotes active learning.

Although other social networks may provide features for enabling users to "like" selected posts, one important distinction between such social networks and the Online Social Education System is that, in the Online Social Education System, the user's interests and needs are continually shifting and changing as the user continues to learn and digest new educational curriculum. For example, if a user "likes" a baking-related post on Facebook, Facebook system may show the user more posts about baking, and it is likely that the user will probably still like baking 3 months later. In contrast, a student user of the Interactive Study Wall may "like" a post relating to algebraic equations one month (e.g., while the student is studying algebraic equations in class), but may no longer be interested in viewing posts relating to algebraic equations three months later, for example, because the student has moved on to studying other subject matter. Accordingly, the Online Social Education System is configured or designed to take into account that the student users are continually learning, and are moving through different curriculum in their classrooms. In this way, the Online Social Education System is able to provide dynamically changing, personalized content for each respective user or groups of users (e.g., of a given classroom, grade, etc.) which is substantially relevant to the specific curriculum which the user is currently studying, and relevant to the current needs and interests of the user. For example:

Students mastering certain topics—posts relating to those topics are filtered out from the user's Interactive Study Wall "feed".

Students identified as having issues with certain topic—posts relating to those topics are included in the user's the user's Interactive Study Wall "feed".

Students identified as having similar "Learning Profiles" may view posts from similar learning profile students.

Interactive Study Wall Filtering and Filtered Interactive Study Wall Feeds

Typically, currently existing online discussion boards are either organized around a topic, or organized around a community. This means users either have to find appropriate forum to ask question, or can only get answers from members of an existing community.

In contrast, in at least one embodiment of the Interactive Study Wall, teachers all use the same Interactive Study Wall with their respective students, but it's a shared Interactive Study Wall across multiple schools, districts, and/or states. For example, students and teachers in the state of Florida may use a single Interactive Study Wall to collaborate with each other, and the Interactive Study Wall may be configured or designed to automatically and/or dynamically filter posts displayed on each respective user's Interactive Study Wall "Feed" so that only relevant and/or appropriate posts are displayed to each respective user, based on various criteria such as, for example, one or more of the following (or combinations thereof):

class;
grade level;
school;
teacher;
school district;
geographic region;
user experience level (e.g., novice vs. advanced user);
user's current education curriculum;
user's current state standards;
etc.

In at least some embodiments, Interactive Study Wall may also provide functionality for enabling users to define or configure various filtering rules and/or filtering parameters.

In at least some embodiments, Interactive Study Wall may also provide functionality for enabling users to search for key words of post.

In at least some embodiments, Interactive Study Wall may also provide functionality for recommending to a given user one or more video tutorials, where such recommendations may be based, at least partially upon the subject matter or relevancy of posts which have been (or are being) viewed by that user.

In at least some embodiments, the Interactive Study Wall may be configured or designed to provide or assign different roles for different users of the Interactive Study Wall. Examples of such different roles may include, for example: Students, Teachers, Study Experts, etc. In at least some embodiments, each different role may have associated therewith a respectively different set of Interactive Study Wall permissions, privileges, and tools for accessing, viewing, and filtering posted Interactive Study Wall content and user activities. For example, in one embodiment, only Study Experts may be provided with ability to close selected threads, or mark them as complete/reviewed/answered (e.g., by commenting on or liking the last post in a given thread).

By using the various Online Education techniques described herein, the Online Social Education System may be configured or designed to achieve an optimum balance between Human interaction and automated systems.

Protected Collaboration and Security Features

Non-clickable profiles. Users may be prevented from viewing or accessing profile information relating to other users of the Interactive Study Wall. This may help to minimize security threats to children/student users.

Private conversations or private messaging between users may be prevented.

Aspects of user identity may be masked but not anonymous (e.g., concealing last name of user, concealing user's school associated, but displaying city where user's school is located, allowing students to choose a nickname while their real identity is still available for admins, teachers, Study Experts, etc.)

Features which encourage positivity and/or discourage negativity.

Friending between users may be prevented.

All conversations may be publically accessible and viewable. No private posts.

User identity authenticated from $3^{rd}$ party system (e.g., School district system)

Duplicate posts allowed so as to allow students to easily ask their questions w/out having to research prior topics/posts Features Relating to Managing Posts/Conversations of Interactive Study Wall In at least one embodiment, the Online Social Education System may include functionality for enabling moderators and Study Experts to manage Interactive Study Wall posts, threads, and conversations. For example, in at least one embodiment, the Interactive Study Wall may be configured or designed to automatically close a discussion thread upon detection of various events/conditions such as, for example, one or more of the following (or combinations thereof):

when a Study Expert or Teacher is the last person to post a comment in the discussion thread;

when a Study Expert or Teacher clicks on a "like" icon or other designated button/icon associated with the discussion thread.

In at least some embodiments, the Online Social Education System may be configured or designed to provide functionality for providing automatic and/or manual closing of Interactive Study Wall threads. For example, in one embodiment, a Study Expert may "like" a posted comment of a discussion thread (e.g., by clicking on "Like" object 1733, FIG. 17) to indicate to the system that the discussion thread is considered "closed" or "answered". In some embodiments, teachers may also be permitted to "like" a posted comment of a discussion thread to indicate to the system that the discussion thread is considered "closed" or "answered". In some embodiments, the Online Social Education System may determine that a particular discussion thread is considered to be "closed" or "answered" only if the most recently posted comment is from the Study Expert (or teacher), and Study Expert (or teacher) has "liked" this comment.

In some embodiments, users may be allowed to subsequently post comments to discussion threads which are considered by the system to be "closed" or "answered".

In some embodiments, a "closed" or "answered" discussion thread may be automatically reopened (e.g., status of discussion thread automatically changed to "open" or "unanswered") if a user posts a subsequent comment to that discussion thread. In some embodiments:

a closed post is considered "answered"

subsequent question could re-open post (change status to "unanswered")

the Online Social Education System may also be configured or designed to analyze punctuation a posted comments to automatically and/or dynamically determine the status of post as "answered" or "unanswered".

In some embodiments, a post may be considered "closed" if last person on thread is Study Expert (or teacher).

In some embodiments, a Study Expert can mark thread as closed (meaning thread is considered to be "answered".

In some embodiments, the Online Social Education System may automatically scan posted comments/questions to identify and/or recognize references to other posts of the Interactive Study Wall (e.g., "Please refer to Post #351781"), and may automatically and dynamically convert such references to hyperlinks to enable users to click on such hyperlinked references to navigate directly to the referenced post(s).

Interactive Study Wall discussion board functionality which, for example, may be restricted to specific video or topic, and not personalized dependent on the needs/interests of user.

Collaborative, non-hierarchical Interactive Study Wall features. For example, the Interactive Study Wall may be configured or designed to enable teachers to use the Interactive Study Wall to interact with their students, but the Wall may be configured as a shared Wall across school, district, state, country, etc., thereby creating a substantially collaborative and open environment among all users, while simultaneously maximizing security for students.

Filtering functionality for enabling personalization of users' Interactive Study Wall interactions, such as, for example, filtering posts to specific students (e.g. based on level of student, student's district, school, course enrollment, etc.). In some embodiments, filtering personalization for one or more students/users may be based, at least partially, on one or more of the following criteria (or combinations thereof):

posts for which a student/user has flagged as being of interest (e.g., user has clicked on "like" button);

posts with which a student/user has actively engaged/interacted;

student performance (e.g., how well student performs on practice tools);

student inputs/self-assessment;

tags/classifications associated with one or more Interactive Study Wall posts (e.g., high difficulty, medium difficulty, low difficulty, conceptual, skills-based, standards (e.g. Common Core Math, state-based standards, geometry, algebra, fractions, etc.)

Dynamic whiteboard functionality. For example, in at least one embodiment, the Interactive Study Wall may include functionality for providing users with access to a dynamic Whiteboard GUI which may be configured or designed to provide various tools for enabling users to initiate various activities such as, for example, one or more of the following (or combinations thereof):

draw diagrams;

draw graphs, either freehand or using pre-set grid lines plot graphs based upon data points, equations, etc.;

capture and upload images (e.g., via mobile device, email, MMS, etc.);

record and upload videos (e.g., via mobile device, email, MMS, etc.);

record and upload annotated/animated whiteboard diagrams;

Click button to bring up dynamic white board which is recorded and displayed on wall in connection with post.

Ability to view and playback entire recording embedded in wall discussion board

Providing drawing and graphic tools

Gridlines feature etc.

In at least one embodiment, where multiple whiteboard pages exist, the dynamic whiteboard may provide navigation links for enabling users to navigate to specific pages, page positions, previously bookmarked pages, etc.

Leaderboard Functionality. In at least some embodiments, Karma points and/or other awards awarded to users of the Interactive Study Wall may be used to generate leaderboard rankings among selected groups of users. In at least some embodiments, the Online Social Education System may include various types of Leaderboard Functionality, which may be configured or designed to display various types of rankings among selected groups of users.

For example, in at least one embodiment, the Interactive Study Wall leaderboard results/rankings may be filtered according to various criteria such as, for example, one or more of the following (or combinations thereof):

class;

grade level;

students in my class;

students in my school;

students in my district;

school;

school district;

geographic region;

district middle schools;

district high schools;

district elementary schools;

user experience level (e.g., novice vs. advanced user);

user demographics such as, for example, sex, age, location, etc.

time range (e.g. lifetime vs. monthly points)

etc.

Leaderboard Functionality may be configured or designed to provide the ability for students to compete against their peers (classmates, school mate, etc.).

Interactive Study Wall leaderboard shows middle school vs. high school rankings depending on the viewing user's grade level (e.g. middle school student will see middle school leaderboard results). In another embodiment, student users may be able to see all students or middle vs. high school leaderboards.

Personalized leaderboard results/rankings may be automatically and/or dynamically displayed to a given user, based on the identity of the viewing user (and/or other criteria associated with that user);

Prizes can be awarded by school, class, period, teacher, district, state, etc. In some embodiments, prizes can be awarded by teacher or by school or district/school system (e.g. charter organizations).

Leaderboard Functionality provides additional incentive for users to proactively participate in conversations and other interactions of the Interactive Study Wall.

Status Update Functionality such as, for example, "check in"/"check out", "Do Not Disturb", etc.

Using social media as avenue towards studying is effective, but students may be distracted by friends who want to chat during study time.

In some embodiments, the Online Social Education System may be configured or designed to include functionality for enabling Students to post updates about their current status (e.g., "check in", "check out", "available", "Do Not Disturb", etc.). In some embodiments, the Online Social Education System may be configured or designed to receive user status updates, and post such status updates to other social media networks such as Facebook, Twitter, etc.

In some embodiments, the Online Social Education System may be configured or designed to include functionality for enabling users to access educational materials from other online educational platforms (e.g. Pearson, Khan Academy, etc.). In this way, students may selectively use educational materials from a variety of different online educational platforms without having to separately sign into each different online educational platform in order to study.

Automated functionality for detecting and preventing students/users cheating with other students/users. For example, in one embodiment, the OSES Server may be configured or designed to analyze and reject reply posts which have been identified as not meeting or satisfying a specified minimum character count. In some embodiments, the Online Social Education System may be configured or designed to include various mechanisms for preventing or prohibiting discussion walls from serving as forums for facilitating cheating (e.g., where students simply type in answers to math problem). Examples of such cheating prevention mechanisms may include, but are not limited to, one or more of the following (or combinations thereof):

Imposing minimum character limits/requirements on response posts to prevent cheating.

Mechanisms for discouraging giving away answer or discouraging "cheating".

Students can flag inappropriate response.

Automated pattern matching for posted answers.

Automated functionality for detecting and preventing students/users from posting answers/solutions to homework and/or test related questions.

Automated student identification authentication.

Automated student-school enrollment verification.

Speed Test/Video Player

Video players which are overly feature-heavy are distracting to students and detract from the video viewing experience (need to save screen space, especially in mobile education environment vs. other markets). However, it is desirable to determine/detect if video playback is being affected because user's internet is too slow to support video viewing.

In some embodiments, the Online Social Education System may be configured or designed to include functionality for enabling a speed test to be automatically conducted when the system detects a potential issue with video playback/streaming to a given user's system.

The user may also be informed that he or she may need to find a faster source of internet. Such functionality helps cut down customer service tech calls. This selectivity/flexibility allows for maximize screen space usage for majority of the time. Speed test only pops up when necessary.

Automatic Pause of Video Playback—When user hits mute on video or computer, the video automatically pauses.

Dynamically customized interfaces. In some embodiments, the Online Social Education System may be configured or designed to include functionality for identifying a user's current activities on the Interactive Study Wall, and providing dynamically customized interfaces specifically configured or designed to facilitate a the user with initiating or performing tasks relating to the user's current activities. Similarly, the Online Social Education System may be configured or designed to include functionality for identifying aspects of a user's current educational curriculum, and providing dynamically customized interfaces specifically configured or designed to facilitate a the user with initiating or performing tasks relating to the user's current educational curriculum (e.g., subject matter which a student is currently studying; standards; school curriculum; etc.). For example, in some embodiments, the OSES Server may be configured or designed to generate and display customized Interactive Study Wall GUIs to different users, in which one or more of the GUIs includes (or provides easy access to) a customized set of symbols, characters, equations, and/or other content which may facilitate a given user in initiating or performing tasks relating to the user's current activities and/or educational curriculum. For example:
- a student user studying chemistry student may be presented with a customized GUI which includes a list of symbols of Periodic Table elements, and which may provide access to functionality for facilitating the user in creating or editing chemistry-related formulas and/or expressions.
- a student user studying algebra student may be presented with a customized GUI which includes a list of symbols representing different mathematical functions, and which may provide access to functionality for facilitating the user in creating or editing algebraic-related formulas and/or expressions.

And/or other aspects/features described and/or referenced herein.

One of the problems which the Online Education techniques described herein help to solve relates to the issues of scaling human interaction with mass online education. As described in greater detail herein, the Online Social Education System may be configured or designed to provide a hierarchy of participants, which facilitates human interaction scaling. For example, Karma points may be awarded by human Study Experts, and given out to human users (e.g., student users) who provide appropriate degrees of assistance, but not too much (e.g., explaining how to reach the answer, as opposed to simply stating the answer). The Online Social Education System also facilitates collaborative interaction among peer student users.

According to different embodiments, the Online Social Education System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the Online Social Education System may include one or more of the following types of systems, components, devices, processes, etc. (or combinations thereof):

Online Social Education System (OSES) (s) 120—In at least one embodiment, the Online Education Server System(s) may be operable to perform and/or implement various types of Online Social Education functions, operations, actions, and/or other features such as those described or referenced herein.

Public/Private Education Network(s) 140, including, for example, Student Information System(s) (SIS), Student Data Management Networks, etc.

User Computer System(s) 130—In at least one embodiment, the User Computer System(s) may be operable to perform and/or implement various types of Online Social Education functions, operations, actions, and/or other features such as those described or referenced herein.

$3^{rd}$ Party System(s) 150, including, for example social networks (e.g., Facebook, Twitter, You Tube, etc.), Online conferencing and webinar systems (e.g., Webex, Adobe Connect, Skype, etc.), etc.

Internet & Cellular Network(s) 110

Remote Database System(s)180

Remote Server System(s)/Service(s)170, which, for example, may include, but are not limited to, one or more of the following (or combinations thereof):
Content provider servers/services
Media streaming servers/services
Database storage/access/query servers/services
Financial transaction servers/services
Payment gateway servers/services
Electronic commerce servers/services
Event management/scheduling servers/services
Etc.

User Mobile Device(s) 160—In at least one embodiment, the User Mobile Device(s) may be operable to perform and/or implement various types of Online Social Education functions, operations, actions, and/or other features such as those described or referenced herein.

etc.

According to different embodiments, at least a portion of the various types of Online Social Education functions, operations, actions, and/or other features provided by the Online Social Education System may be implemented at one or more client systems(s), at one or more server systems (s), and/or combinations thereof.

In at least one embodiment, the Online Social Education System may be operable to utilize and/or generate various different types of data and/or other types of information when performing specific tasks and/or operations. This may include, for example, input data/information and/or output data/information. For example, in at least one embodiment, the Online Social Education System may be operable to access, process, and/or otherwise utilize information from one or more different types of sources, such as, for example, one or more local and/or remote memories, devices and/or systems. Additionally, in at least one embodiment, the Online Social Education System may be operable to generate one or more different types of output data/information, which, for example, may be stored in memory of one or more local and/or remote devices and/or systems. Examples of different types of input data/information and/or output data/information which may be accessed and/or utilized by the Online Social Education System may include, but are not limited to, one or more of those described and/or referenced herein.

According to specific embodiments, multiple instances or threads of the Interactive Study Wall may be concurrently implemented and/or initiated via the use of one or more processors and/or other combinations of hardware and/or hardware and software. For example, in at least some embodiments, various aspects, features, and/or functionalities of the Interactive Study Wall may be performed, implemented and/or initiated by one or more of the various systems, components, systems, devices, procedures, processes, etc., described and/or referenced herein.

In at least one embodiment, a given instance of the Online Social Education System may access and/or utilize information from one or more associated databases. In at least one embodiment, at least a portion of the database information may be accessed via communication with one or more local and/or remote memory devices. Examples of different types of data which may be accessed by the Online Social Education System may include, but are not limited to, one or more of those described and/or referenced herein.

According to different embodiments, various different types of encryption/decryption techniques may be used to facilitate secure communications between devices in Online Social Education System(s) and/or Online Social Education Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the Interactive Study Wall functionality may be initiated in response to detection of one or more conditions or events satisfying one or more different types of minimum threshold criteria for triggering initiation of at least one action and/or operation. Various examples of conditions or events which may trigger initiation and/or implementation of one or more different threads or instances of the Interactive Study Wall functionality may include, but are not limited to, one or more of those described and/or referenced herein.

It may be appreciated that the Online Social Education System of FIG. 1 is but one example from a wide range of Online Social Education System embodiments which may be implemented. Other embodiments of the Online Social Education System (not shown) may include additional, fewer and/or different components/features that those illustrated in the example Online Social Education System embodiment of FIG. 1.

Generally, the Online Social Education techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the Online Social Education techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Online Social Education GUIs

FIGS. 6-10, 10A, 11-14, and 16-22 illustrate example screenshots of various GUIs which may be used for facilitating activities relating to one or more of the online social education aspects disclosed herein. In at least one embodiment, at least a portion of the GUIs may be configured or designed for use at one or more user computer devices and/or mobile devices.

For illustrative purposes, each of the example screenshots of FIGS. 6-10, 10A, 11-14, and 16-22 relate to specific embodiments of an Interactive Study Wall which has been specifically configured for facilitating online social education relating to algebra (herein referred to as "Algebra Wall"). However, it will be appreciated that other embodiments of Interactive Study Walls may be specifically configured for facilitating online social education relating to other educational topics/standards/curriculum. Additionally, as illustrated and described with respect to the example screenshots of FIGS. 6-10, 10A, 11-14, and 16-22, the display of Interactive Study Wall content and/or access to various Interactive Study Wall functionality may differ, for example, based on the user's identity and/or user classification type (e.g., Teacher, Study Expert, Student). Additionally, in at least some embodiments, at least a portion of the Interactive Study Wall content which is displayed to a given user may be dynamically generated and/or dynamically filtered.

Figure 6:
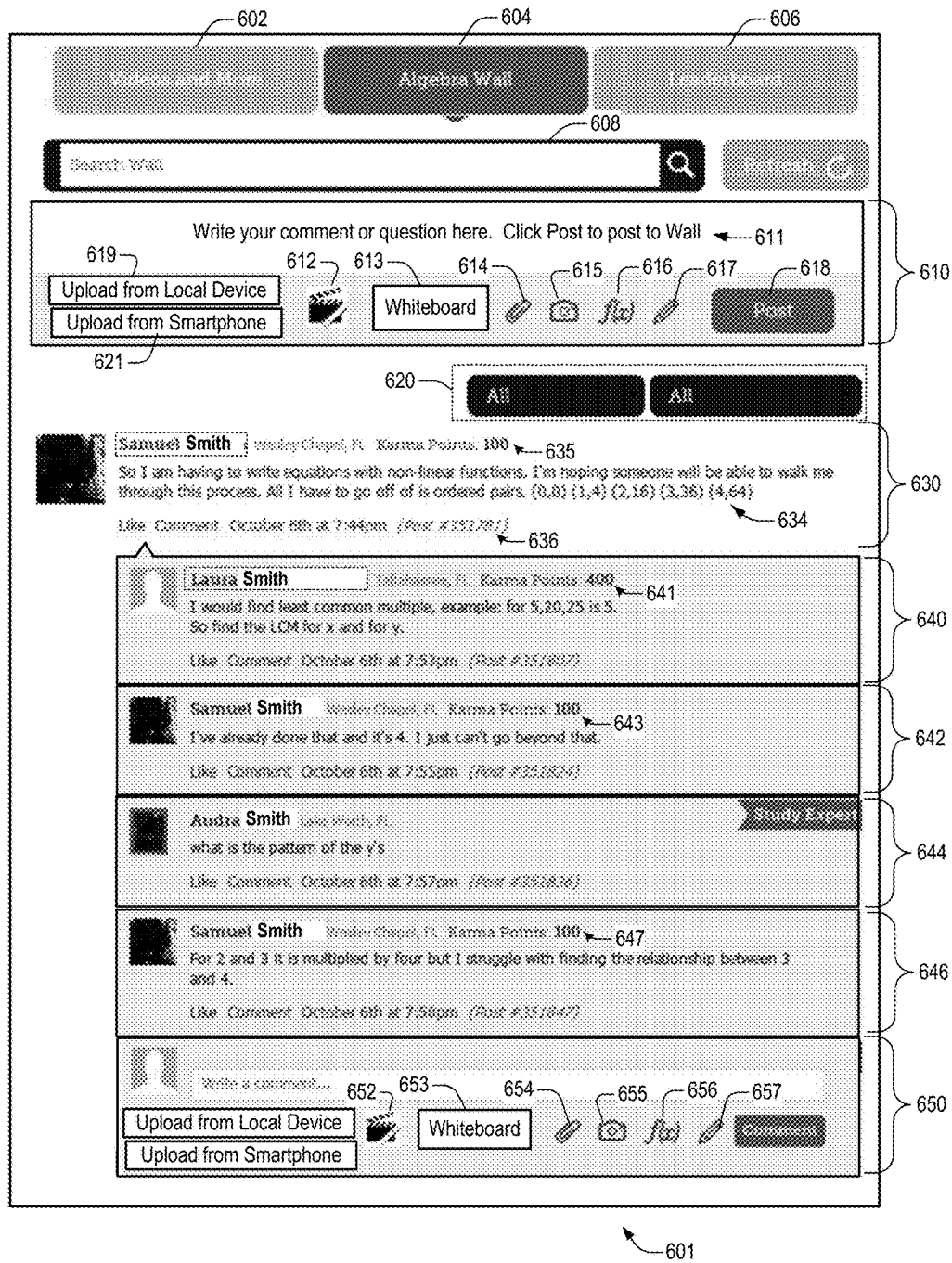

FIG. 6 shows an example screenshot of an Student Interactive Study Wall GUI 601 in accordance with a specific embodiment. According to different embodiments, the Student Interactive Study Wall GUI 601 may be configured or designed to enable students to perform a variety of activities such as, for example:

Browsing questions, comments, threads and discussions posted to the Interactive
Study Wall;
Viewing Interactive Study Wall posts (e.g., 630) such as those posted by the student user, other students, teachers, and/or Study Experts;
Viewing comments/replies to Interactive Study Wall posts (e.g., 640, 642, 644, 646) such as those posted by the student user, other students, teachers, and/or Study Experts;
Searching for posts relating to specific content, keywords, topics, etc.;
Drafting and posting questions to the Interactive Study Wall;
Drafting and posting comments or replies to the Interactive Study Wall;
And/or other types of activities described and/or referenced herein.

As illustrated in the example embodiment of FIG. 6, the Student Interactive Study Wall GUI 601 may be configured or designed to provide a student user with access to a variety of functions and/or features of the Interactive Study Wall such as, for example, one or more of the following (or combinations thereof):

Access to tutorials, videos, and other educational content 602

Access to Interactive Study Wall Leaderboard(s) 606

Keyword search functionality 608

Interfaces (e.g., 610, 650) for enabling student user to initiate new posts (e.g., via 610), post comments/questions/replies to existing threads/posts (e.g., via 650), etc.

As illustrated in the example embodiment of FIG. 6, the Interface portions 610 and 650 may include features and/or functionality for enabling the student user to initiate and/or perform one or more of the following operation(s)/action(s) (or combinations thereof):

Select, upload and post attachments (614).

Select, capture, edit, annotate, upload and post images or photos (615).

Create and post equations via equation editor functionality (616).

Record, edit, upload and post video content (612).

Access various types of whiteboard functionality (e.g., 613, 617), which, for example, may be used to create and post drawings, graphs, animated tutorials, etc. For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

Post an image or video captured from the user's smartphone (621).

Post an image or video captured from the user's computer, tablet, etc. (619).

In at least one embodiment, students may preview their post before publishing their post on the Interactive Study Wall.

Post/Thread filtering functionality (e.g., 620) for enabling student users to selectively include or exclude display of posts/threads by defining, configuring and/or setting various filtering criteria such as, for example, one or more of the following (or combinations thereof):

Students' Teacher

Students' Section/Class

Students' School

Students' District

Students' Grade Level

Students' Educational curriculum such as, for example: class/grade/school/state curriculum information.

Student's profile data such as, for example: User ID, User email address, User IP address, User messaging address, etc.

Students' Region (e.g. Panhandle, Southern Florida, etc.)

Students' Consortiums (e.g. NEFEC schools, etc.)

Students' School Rankings

Students' Gender

Students' Demographics

Students' test scores from previous formative assessments (e.g. benchmarks)

Students' test scores from previous summative assessments (e.g. end of course exams)

Post difficulty level (e.g., as ranked by algorithms)

Post difficulty level (e.g., as ranked by humans)

Number of posts started by students

Number of comments (replies) made by students

Number of karma points made by students

Number of videos watched by students

Difficulty level of videos watched by students

Number of "Test Yourself!" questions attempted by students

Number of "Test Yourself!" questions correctly answered by students

Percentage of "Test Yourself!" questions correctly answered by students

Posts/threads which have been identified as being closed or correctly answered

Posts/threads which have been identified as still being open or unanswered,

Etc.

User Award/Incentive Functionality ("Karma points")

Students may be allocated points (e.g., "Karma points") or awards or incentives for posting questions and/or for answering peers' questions on the Interactive Study Wall. In some embodiments, the Interactive Study Wall GUIs may include functionality for enabling Study Experts or moderators to award students with differing amounts of "Karma points" for asking questions and/or posting comments in response to questions/comments posted by other users.

For example, as illustrated in the example embodiment of FIG. 6, each student user has associated therewith a respective Karma Point score (e.g., 635, 641, 643, 647) which may represent that user's current, cumulative Karma Point total.

In some embodiments, the cumulative Karma Point score may be automatically calculated and displayed by the OSES Server based on Karma Point awarded to each user over a given time interval (such as, for example, a range of days, a range of months, lifetime, a range of time corresponding to the beginning and end of a school year, etc.).

Figure 7:
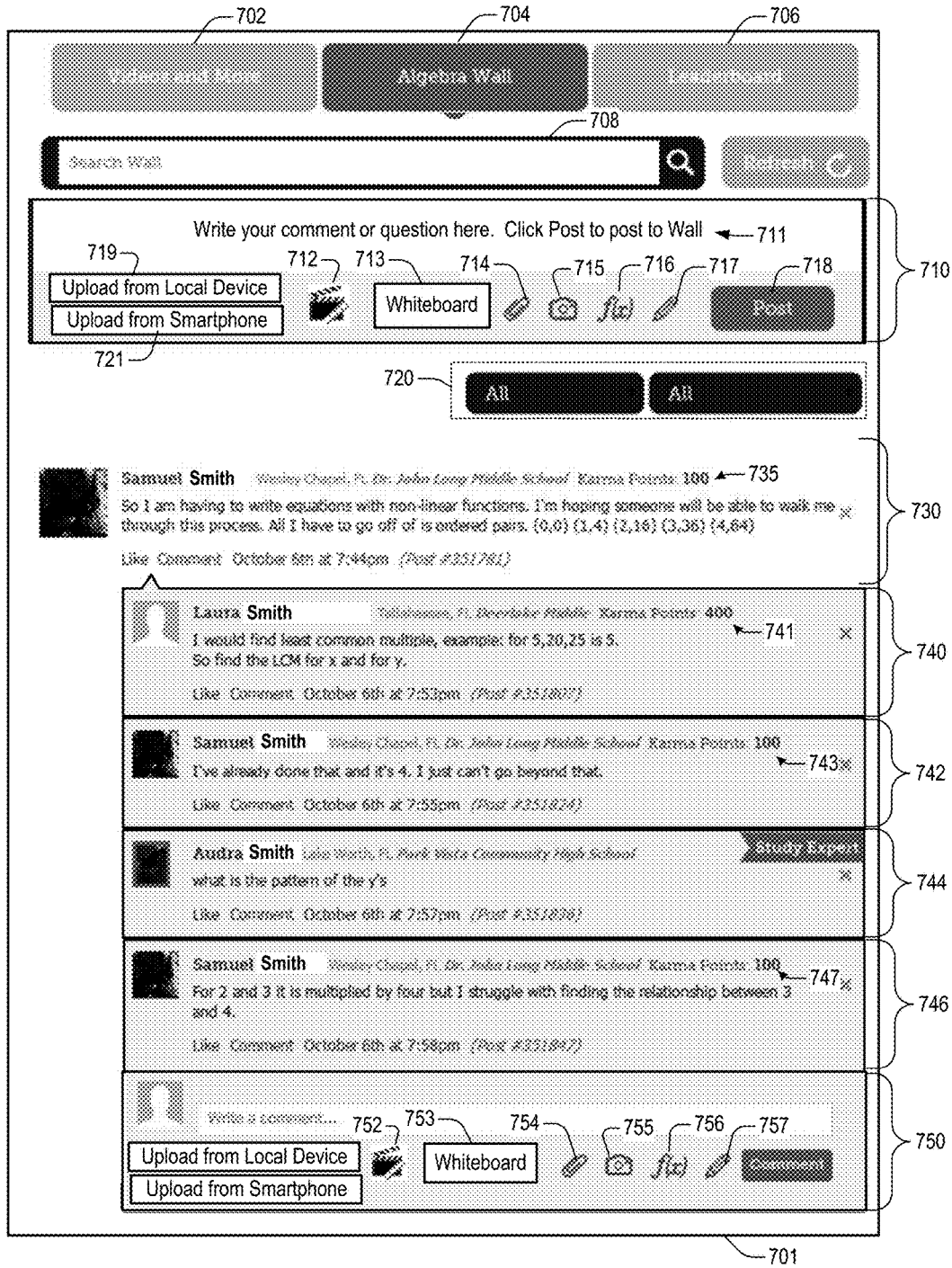

FIG. 7 shows an example screenshot of a Teacher Interactive Study Wall GUI 701 in accordance with a specific embodiment. According to different embodiments, the Teacher Interactive Study Wall GUI 701 may be configured or designed to enable school teachers and/or other school educators to perform a variety of activities such as, for example:

Browsing questions, comments, threads and discussions posted to the Interactive Study Wall;

Viewing Interactive Study Wall posts (e.g., 730) such as those posted by the Teacher user, students, other teachers, and/or Study Experts;

Viewing comments/replies to Interactive Study Wall posts (e.g., 740, 742, 744, 746) such as those posted by the Teacher user, students, other teachers, and/or Study Experts;

Searching for posts relating to specific content, keywords, topics, etc.;

Drafting and posting questions to the Interactive Study Wall;

Drafting and posting comments or replies to the Interactive Study Wall;

And/or other types of activities described and/or referenced herein.

In at least one embodiment, a "Teacher" as described herein may refer to an educator (e.g., teacher, professor, instructor, math coach, etc.) who is a member of a school staff or administration. Typically, such Teachers may have associated identities and/or profiles in the school district's computer network(s) which may be used to authenticate and verify a Teacher's credentials.

As illustrated in the example embodiment of FIG. 7, the Teacher Interactive Study Wall GUI 701 may be configured or designed to provide a Teacher user with access to a variety of functions and/or features of the Interactive Study Wall such as, for example, one or more of the following (or combinations thereof):

- Access to tutorials, videos, and other educational content (702)
- Access to Interactive Study Wall Leaderboard(s) (706)
- Keyword search functionality (708)
- Interfaces (e.g., 710, 750) for enabling Teacher user to initiate new posts (e.g., via 710), post comments/questions/replies to existing threads/posts (e.g., via 750), etc.

As illustrated in the example embodiment of FIG. 7, the Interface portions 710 and 750 may include features and/or functionality for enabling the Teacher user to initiate and/or perform one or more of the following operation(s)/action(s) (or combinations thereof):

- Select, upload and post attachments (714).
- Select, capture, edit, annotate, upload and post images or photos (715).
- Create and post equations via equation editor functionality (716).
- Record, edit, upload and post video content (712).
- Access various types of whiteboard functionality (e.g., 713, 717), which, for example, may be used to create and post drawings, graphs, animated tutorials, etc. For example, as illustrated in the example embodiment of FIG. 7, Teacher Interactive Study Wall GUI 701 includes buttons or icons (e.g., Whiteboard Buttons 713, 753) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.
- Post an image or video captured from the user's smartphone (721).
- Post an image or video captured from the user's computer, tablet, etc. (719).
- In at least one embodiment, Teachers may preview their post before publishing their post on the Interactive Study Wall.
- Post/Thread filtering functionality (e.g., 720) for enabling Teacher users to selectively include or exclude display of posts/threads by defining, configuring and/or setting various filtering criteria such as, for example, one or more of the following (or combinations thereof):
- Students' Teacher
- Students' Section/Class
- Students' School
- Students' District
- Students' Grade Level
- Students' Region (e.g. Panhandle, Southern Florida, etc.)
- Students' District Consortiums (e.g. NEFEC schools, etc.)
- Students' Educational curriculum such as, for example: class/grade/school/state curriculum information.
- Student's profile data such as, for example: User ID, User email address, User IP address, User messaging address, etc.
- Students' School Rankings
- Students' Gender
- Students' Demographics
- Students' test scores from previous formative assessments (e.g. benchmarks)
- Students' test scores from previous summative assessments (e.g. end of course exams)
- Post difficulty level (e.g., as ranked by algorithms)
- Post difficulty level (e.g., as ranked by humans)
- Number of posts started by Students
- Number of comments (replies) made by Students
- Number of karma points made by Students
- Number of videos watched by Students
- Difficulty level of videos watched by Students
- Number of "Test Yourself!" questions attempted by Students
- Number of "Test Yourself!" questions correctly answered by Students
- Percentage of "Test Yourself!" questions correctly answered by Students
- Teachers' Section/Class
- Teachers' School
- Teachers' District
- Teachers' Grade Level
- Teachers' Region (e.g. Panhandle, Southern Florida, etc.)
- Teachers' District Consortiums (e.g. NEFEC schools, etc.)
- Teachers' School Rankings
- Teachers' Gender
- Teachers' Demographics
- Post difficulty level (e.g., as ranked by algorithms)
- Post difficulty level (e.g., as ranked by humans)
- Number of posts started by Students
- Number of comments (replies) made by Students
- Number of karma points made by Students
- Number of videos watched by Students
- Difficulty level of videos watched by Students
- Number of "Test Yourself!" questions attempted by Students
- Number of "Test Yourself!" questions correctly answered by Students
- Percentage of "Test Yourself!" questions correctly answered by Students
- Number of posts started by Teachers
- Number of comments (replies) made by Teachers
- Number of karma points awarded by Teachers
- Number of videos watched by Teachers
- Difficulty level of videos watched by Teachers
- Posts/threads which have been identified as being closed or correctly answered
- Posts/threads which have been identified as still being open or unanswered,
- Etc.

In at least some embodiments, teachers and Study Experts may be provided with functionality for filtering posts based on one or more of the following types of filtering criteria (or combinations thereof):

- Classroom,
- Teacher,

Grade,
Section,
School,
District,
State,
Etc.

User Award/Incentive Functionality ("Karma points")

As illustrated in the example embodiment of FIG. 7, the Teacher Interactive Study Wall GUI 701 may be configured or designed to display Student Karma Point information including respective Karma Point scores (e.g., 735, 741, 743, 747) which represent that user's current Karma Point score.

In some embodiments, the Online Social Education System may be configured or designed to enable selected teachers to award Karma points to selected student users or selected groups of student users. However, the Online Social Education System may include automated mechanisms for preventing or discouraging teachers from showing favoritism in awarding Karma points to their own students. For example, in one embodiment, the OSES Server may allow teachers to award Karma points to students from other schools, but may prevent teacher from awarding Karma points to students who attend the same school as the teacher.

Figure 8:
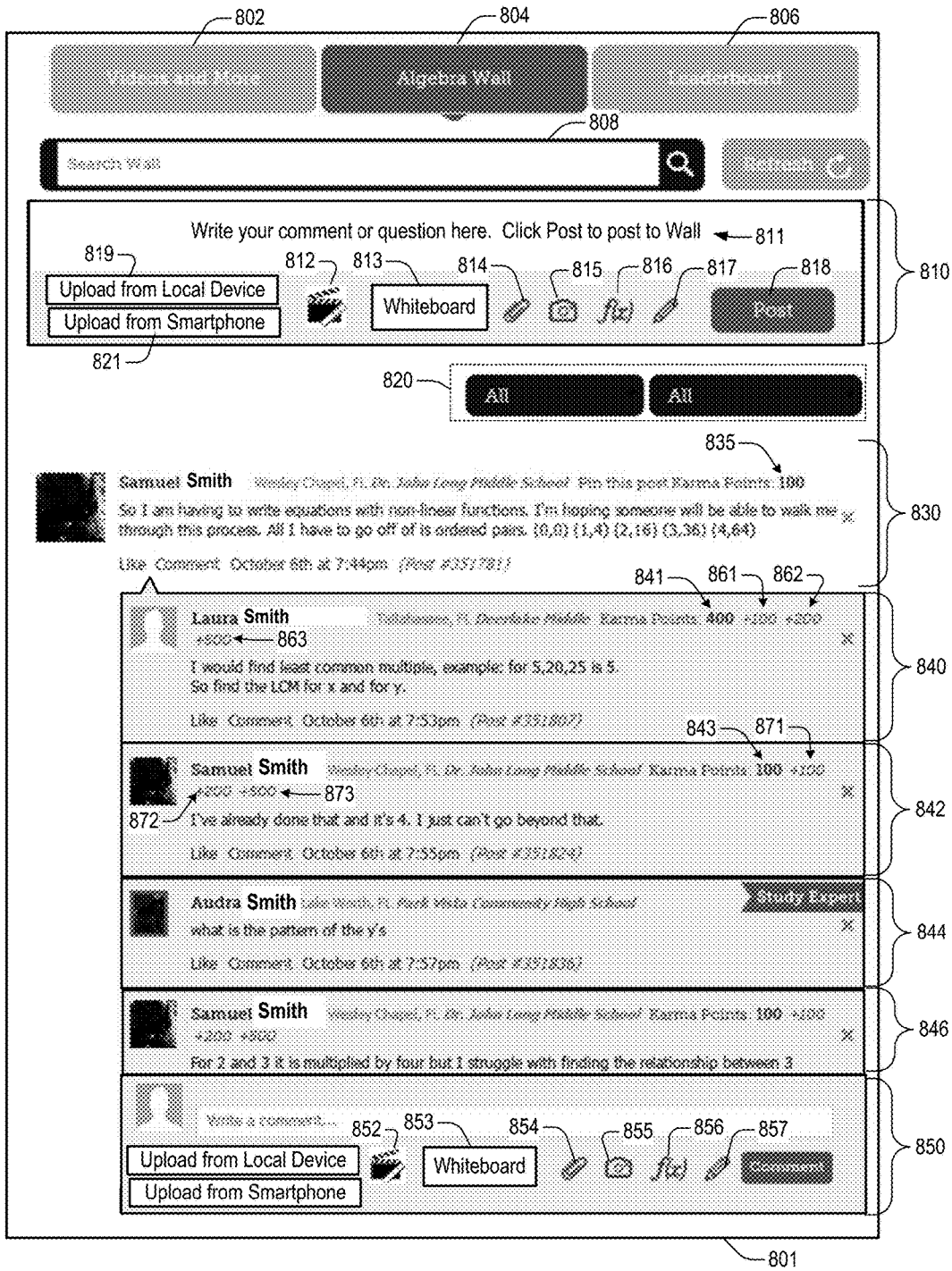

FIG. 8 shows an example screenshot of a Study Expert Interactive Study Wall GUI 801 in accordance with a specific embodiment. According to different embodiments, the Study Expert Interactive Study Wall GUI 801 may be configured or designed to enable school Study Experts and/or other teachers and school educators to perform a variety of activities such as, for example, one or more of those described and/or referenced herein with respect to the Teacher Interactive Study Wall GUI 701 of FIG. 7.

In at least one embodiment, a "Study Expert" as described herein may refer to any third-party person who has been provided with proper authorization/authority (e.g., from the Interactive Study Wall administration) to serve as an "educational moderator/facilitator" of one or more portions of the Interactive Study Wall.

As illustrated in the example embodiment of FIG. 8, the Study Expert Interactive Study Wall GUI 801 may be configured or designed to provide a Study Expert user with access to a variety of functions and/or features of the Interactive Study Wall such as, for example, one or more of the following (or combinations thereof):

Access to tutorials, videos, and other educational content (802)

Access to Interactive Study Wall Leaderboard(s) (806)

Keyword search functionality 808

Interfaces (e.g., 810, 850) for enabling Study Expert user to initiate new posts (e.g., via 810), post comments/questions/replies to existing threads/posts (e.g., via 850), etc.

As illustrated in the example embodiment of FIG. 8, the Interface portions 810 and 850 may include features and/or functionality for enabling the Study Expert user to initiate and/or perform one or more of the following operation(s)/action(s) (or combinations thereof):

Select, upload and post attachments (814).

Select, capture, edit, annotate, upload and post images or photos (815).

Create and post equations via equation editor functionality (816).

Record, edit, upload and post video content (812).

Access various types of whiteboard functionality (e.g., 813, 817), which, for example, may be used to create and post drawings, graphs, animated tutorials, etc. For example, as illustrated in the example embodiment of FIG. 8, Study Expert Interactive Study Wall GUI 801 includes buttons or icons (e.g., Whiteboard Buttons 813, 853) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

Post an image or video captured from the user's smartphone (821).

Post an image or video captured from the user's computer, tablet, etc. (819).

In at least one embodiment, Study Experts may preview their post before publishing their post on the Interactive Study Wall.

Change the permissions level of an edited image, allowing images to be edited by one or more specified user(s) and/or group(s) of user(s) (e.g., one student, a group of students, teachers associated with a specific grade, teachers associated with a specific school, all students, all teachers, etc.).

Award Karma points (and/or other incentives/rewards) to Student users.

Edit posts/discussion threads.

Mark selected discussion threads as "closed".

Etc.

Post/Thread filtering functionality (e.g., 820) for enabling Study Expert users to selectively include or exclude display of posts/threads by defining, configuring and/or setting various filtering criteria such as, for example, one or more of those described and/or referenced herein.

In at least some embodiments, Study Experts and Study Experts may be provided with functionality for filtering posts based on one or more of the following types of filtering criteria (or combinations thereof):

Classroom,
Teacher,
Grade,
Section,
School,
District,
State,
Subject,
Difficulty level of questions,
Date,
Answered/Unanswered threads
Etc.

User Award/Incentive Functionality ("Karma points")

As illustrated in the example embodiment of FIG. 8, the Study Expert Interactive Study Wall GUI 801 may be configured or designed to display Student Karma Point information including respective Karma Point scores (e.g., 835, 841, 843, 847) which represent that user's current Karma Point score.

Additionally, as illustrated in the example embodiment of FIG. 8, the Study Expert Interactive Study Wall GUI 801 may be configured or designed to include functionality (e.g., 861, 862, 863, 871, 872, 873, etc.) for enabling Study Experts to award different incremental values of additional Karma points (e.g., +100, +200, +500) to one or more student users.

In at least some embodiments, the Interactive Study Wall may be configured or designed to enable Study Experts (and/or other types of moderators) to award different incremental values of additional Karma points (e.g., +100, +200, +500) to one or more student users for facilitating and encouraging learning and user participation.

User Award/Incentive Functionality ("Karma Points")

In at least one embodiment, Karma points may be awarded to users who post questions on the Interactive Study Wall (e.g., as illustrated at 1013, 1014, 115, 1016 of FIG. 10), and/or may be awarded to users who post replies or comments on the Interactive Study Wall (e.g., as illustrated at 861, 862, 863, 871, 872, 873 of FIG. 8).

In some embodiments, when a user has been awarded Karma points for a particular post, the OSES Server may automatically update the user's current Karma point score by adding the current Karma point award to the user's current Karma point score (e.g., corresponding to the user's current Karma point score which existed at the time when the additional Karma points were awarded to the user).

In some embodiments, the Online Social Education System may be configured or designed to include functionality for tracking Karma point award events and their corresponding Interactive Study Wall events (e.g., user posts which received Karma point awards), and for preventing duplication of Karma point awards based on the same Interactive Study Wall event(s).

In at least some embodiments, when a user has been awarded Karma points for a particular post (e.g., by a first Study Expert), the OSES Server may automatically and/or dynamically update or modify one or more of the Interactive Study Wall GUIs (e.g., of the first Study Expert, and of a second Study Expert) to prevent additional Karma points from being awarded to the user for the same post.

Figure 10:
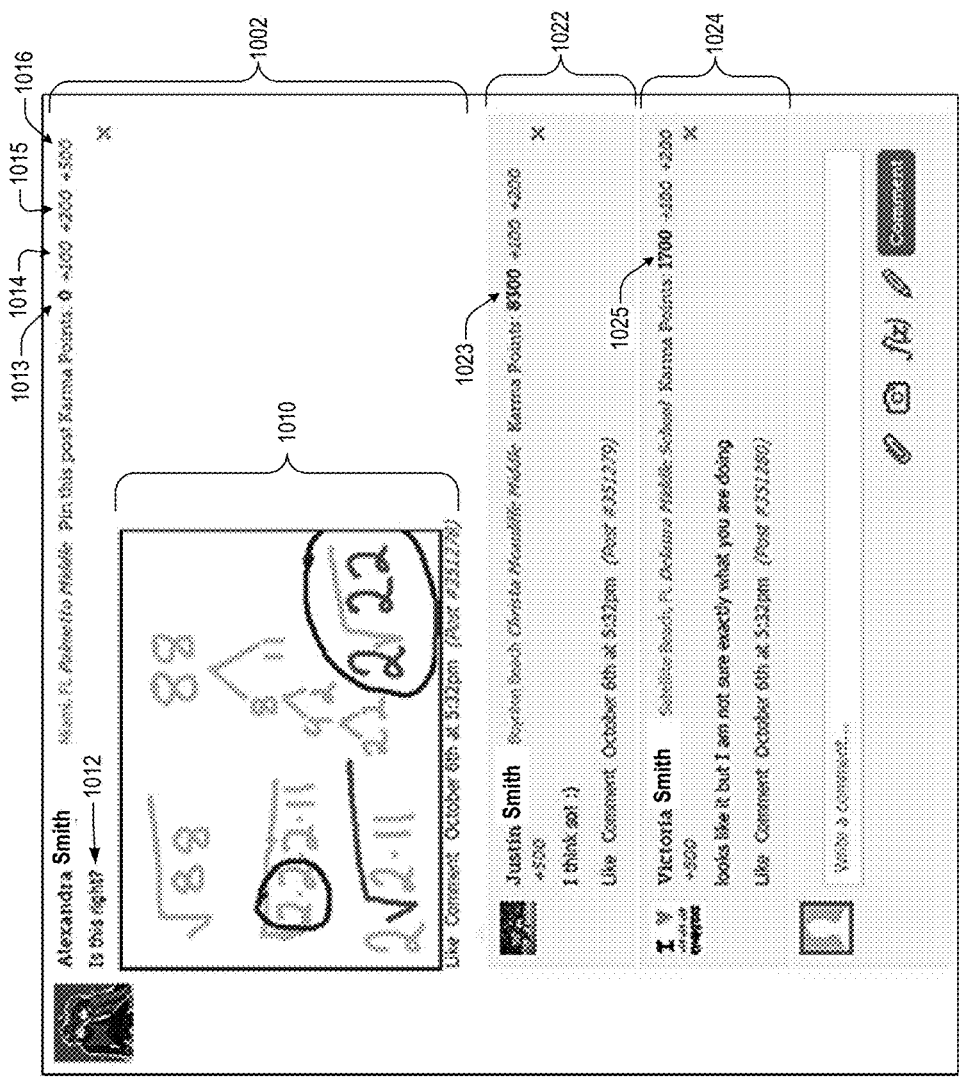
Figure 10A:
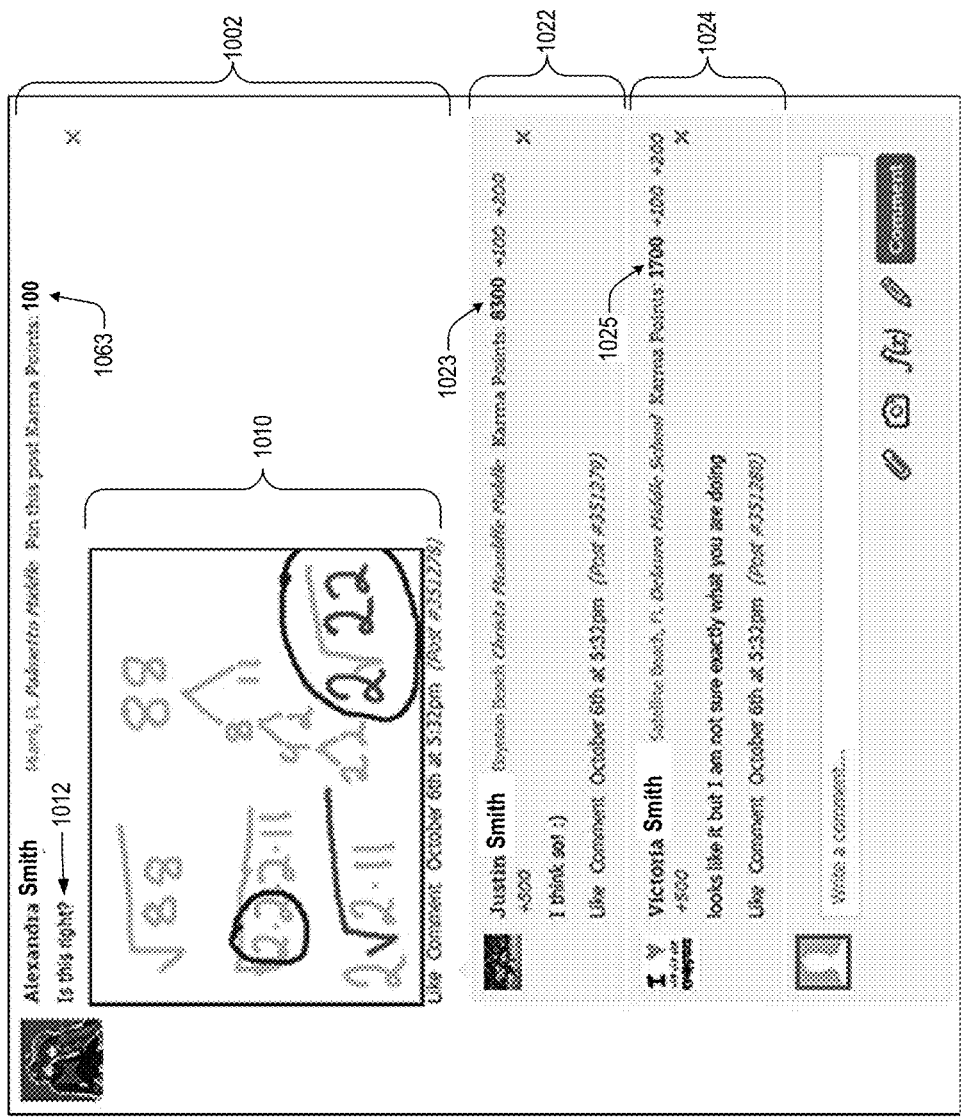

By way of illustration, FIGS. 10 and 10A illustrate example screenshots of different Study Expert Interactive Study Wall GUIs which help illustrate the features relating to the awarding of Karma points and to the prevention of additional Karma points from being awarded for a given post (e.g. 1002). Referring first to FIG. 10, it is assumed that the user (Alexandra Smith) has posted an initial question 1002 on the Interactive Study Wall, and that a Study Expert is viewing the Interactive Study Wall discussion relating to post 1002 via Study Expert Interactive Study Wall GUI 1001. As illustrated in the example embodiment of FIG. 10, the user's current Karma point score (indicated at 1013) is zero. In this particular example, it is assumed that the user (Alexandra Smith) has not yet been awarded with Karma points for posting this question since the Study Expert Interactive Study Wall GUI 1001 includes Karma point award features/functionality (e.g., 1014, 115, 1016) for enabling the viewing Study Expert to award the user with Karma points associated with post 1002. It is then assumed that the Study Expert takes action to award the user with +100 Karma points for posting question 1002 on the Interactive Study Wall. In one embodiment, the Study Expert may award the user with +100 Karma points for posting question 1002 by clicking on the displayed "+100" object (1013). This action is detected by the OSES Server, which responds by automatically updating the user's current Karma point score by adding the current Karma point award (+100) to the user's current Karma point score (0), resulting in an updated Karma point score of 100. In other embodiments, if the Study Expert had desired to award +200 Karma points or +500 Karma points to the user (instead of +100), the Study Expert could have done so by clicking on the displayed "+200" object (1015) or "+500" object (1016), respectively.

In at least one embodiment, after the user has been awarded +100 Karma points for posting question 1002 on the Interactive Study Wall, the OSES Server may automatically update the Study Expert Interactive Study Wall GUIs (e.g., of any Study Experts who subsequently view the discussion thread relating to post 1002) to prevent additional Karma points from being awarded to the user for the same post. An example of this is illustrated in FIG. 10A. In the specific example embodiment of FIG. 10A, it is assumed that the user has already been awarded +100 Karma points for posting question 1002 on the Interactive Study Wall. Accordingly, as illustrated in the example embodiment of FIG. 10A, the user's displayed Karma point score is now 100 (as shown at 1063), and the Study Expert Interactive Study Wall GUI 1001 has been modified (e.g., by the OSES Server) to omit, remove, or prevent the display of the Karma point award features/functionality (e.g., such as that displayed 1014, 115, 1016 of FIG. 10) to thereby to prevent additional Karma points from being awarded to the user for posting question 1002.

In at least some embodiments, the Interactive Study Wall may be configured or designed to enable Study Experts (and/or other types of moderators) to penalize users who post inappropriate questions/comments by causing different incremental values of Karma points to be subtracted from a given user's current Karma point score.

In at least some embodiments, the awarding (and/or subtracting) of Karma points by a given Study Expert may be discretionary, and may be based at least partially upon predefined guidelines, such as, for example, the Karma Points Distribution Guidelines described below.

Example Karma Point Distribution Guidelines

In at least one embodiment, the Online Social Education System may be configured or designed to facilitate implementation and enforcement of a set of Karma Point Distribution Guidelines which may govern the actions of Study Experts in awarding and distributing Karma points to users of the Interactive Study Wall. In some embodiments, the Online Social Education System may be configured or designed to include functionality for automatically awarding and/or distributing Karma points to Interactive Study Wall users based on predefined sets of rules. However, in at least some embodiments, it is desirable for Study Experts (humans) to review Interactive Study Wall posts and award Karma points in accordance with established Karma Point Distribution Guidelines. One reason for this is that Study Experts inject a human element into the points-incentives-rewards system, so if a student exhibits a new, positive behavior that is not covered explicitly in the guidelines, Study Experts are empowered to award Karma points based on their assessment of the user's behavior and/or contributions.

In one embodiment, there may be 3 (or more) levels or tiers of Karma point awards. These different levels may be purposefully staggered such that:

Level 1 is attainable;

Level 2 is a reachable goal for students who consistently earn Level 1 scores; and Level 3 is of a more significant amount so as to reward especially excellent assistance/contribution on the Interactive Study Wall.

In one embodiment, Level 3 may have the fewest number of guidelines because it is meant to be awarded for exceptional cases. The point values in parenthesis are one example of the levels, but it is possible to adjust points on the back end as needed.

Level 1 Guidelines. In at least one embodiment, Level 1 Karma points (e.g. 100 Karma points) may be awarded if one or more of the following events/conditions occur:
- Student posts his/her first post on the Interactive Study Wall. In some embodiments, the OSES Server may be configured or designed to include functionality for: tracking first posts by users of the Interactive Study Wall, notifying Study Experts of event(s) relating to a user's first post, and/or preventing duplication of Karma point awards based on the same event.
- Student changes default picture to personalized one.
- Student responds to a question by referencing an Interactive Study Wall video which is relevant to the question.
- Student responds to a question by referencing another Interactive Study Wall post which is relevant to the question.
- Student gives the $1^{st}$ step of a problem to help prompt another student, but does not give the entirety of the problem.
- Student answers a challenge question (a question posed by a Study Expert) thoroughly, demonstrating his/her thought process fully.

Level 2 Guidelines. In at least one embodiment, Level 2 Karma points (e.g. 200 Karma points) may be awarded if one or more of the following events/conditions occur:
- Student responds to a question by referencing to a specific segments of the Interactive Study Wall video which is relevant to the question.
- Student uses whiteboard tool to illustrate problem while helping other students. The whiteboard tool is used to enhance explanation when previous attempts to help other students are not working.
- Student uploads picture (from phone, computer, etc.) to illustrate problem while helping other students. The whiteboard tool is used to enhance explanation when previous attempts to help other students are not working.
- Student follows up with other student to check for understanding.
- Student highlights common misconceptions in a given problem or scenario.

Level 3 Guidelines. In at least one embodiment, Level 3 Karma points (e.g. 500 Karma points) may be awarded if one or more of the following events/conditions occur:
- Student creates parallel questions to further others' understanding after other students indicate they understand original question.
- Student goes above and beyond in ensuring another student's understanding of the material, by providing a combination of techniques, including alternate explanations, visual aids, references to previous posts, challenge questions, etc.

In other embodiments, Karma point awards and/or other types of user incentive programs for Interactive Study Wall participation may be implemented, at least partially, based on one or more of the following criteria (or combinations thereof):
- Giving a predetermined amount of points formulaically (e.g. 10 points after posting a comment). However, this may encourage students to do same action (e.g., post a comment) over and over, which may have the undesirable effect of diminishing the quality of user responses/posts/comments.
- Karma point awards may be configured at incremental values (e.g., +10/+50/+100/+200/+500, and/or other desired values) (e.g., rather than merely +100 Karma points at a time) in order to provide students with an easy way to earn points, and also to provide incentives for encouraging students to extend themselves above and beyond their normal comfort levels.

In at least one embodiment, only Study Expert can give out Karma points (not teachers, not students).

Unlike conventional online education discussion boards, the Interactive Study Wall may be configured to include functionality for enabling live moderators (e.g., Study Experts) to monitor and interact with discussion boards, and award points to student users based on the quality and/or caliber of the students' interactions.

Unlike conventional online education discussion boards, the OSES Server does not necessarily assign the teacher or teacher assistant on record as a moderator of the Interactive Study Wall. Rather, in at least some embodiments, Study Experts (e.g., which are $3^{rd}$ parties outside of the student/school system) may be selected (e.g., by administrators of the Online Social Education System) and assigned as moderators of the Interactive Study Wall.

Example Karma Point Granularity Groups

According to different embodiments, the value or amount of Karma points (and/or other types of user incentive awards for Interactive Study Wall participation) which are awarded or distributed (e.g., to a given Interactive Study Wall student user), may be based, at least partially, upon consideration of a various factors such as, for example, one or more of the following (or combinations thereof):
- Student User's School Level (e.g. Middle School vs. High School)
- Student Users' testing level (e.g. $1^{st}$ time test-taker vs. re-takers)
- Previous top score earners/prize winners (e.g. iPad winners)
- Top 50 of leaderboard karma point earners
- Student User's Experience Level (e.g. new users vs. veteran users)
- Students who help other students outside of their section, school, and/or district (e.g., such activity may justify increased Karma point awards to the helping student)

Leaderboard Functionality

In at least some embodiments, Karma Points and/or other awards awarded to users of the Interactive Study Wall may be used to generate leaderboard rankings among selected groups of users. In at least some embodiments, the Online Social Education System may include various types of Leaderboard Functionality which may be configured or designed to display various types of rankings among selected groups of users.

For example, in at least one embodiment, the Interactive Study Wall leaderboard results/rankings may be filtered according to various criteria such as, for example, one or more of the following (or combinations thereof):
- class;
- grade level;
- students in my class;
- students in my school;
- students in my district;
- school;
- school district;

geographic region;
district middle schools;
district high schools;
district elementary schools;
user experience level (e.g., novice vs. advanced user);
user demographics such as, for example, sex, age, location, etc.
etc.

Leaderboard Functionality may be configured or designed to provide the ability for students to compete against their peers (classmates, school mate, etc.).

Interactive Study Wall leaderboard shows middle school vs. high school rankings depending on the viewing user's grade level (e.g. middle school student will see middle school leaderboard results).

Personalized leaderboard results/rankings may be automatically and/or dynamically displayed to a given user, based on the identity of the viewing user (and/or other criteria associated with that user);

Prizes can be awarded by school, class, period, teacher, district, state, etc. In some embodiments, prizes can be awarded by teacher, school, or by the school district.

Leaderboard Functionality provides additional incentive for users to proactively participate in conversations and other interactions of the Interactive Study Wall.

In some embodiments, prizes may be awarded to students with the relatively highest Karma points earned during a specified time interval (e.g., one week, 7 days, one month, 30 days, school quarter, school semester, school year, etc.)

In at least some embodiments, Leaderboard Functionality and awarding of prizes may be configured in such as way so as to encourage collaboration among student users.

In at least some embodiments, Leaderboard Functionality and awarding of prizes may be configured in such as way so as to encourage competition among student users.

In at least some embodiments, Leaderboard Functionality and awarding of prizes may be configured in such as way so as to encourage collaboration among student users of the same school, while also encouraging competition among student users of different schools.

Online Discussion Thread Whiteboard Functionality

Several aspects of the present application relate to the provisioning or integration of discussion thread whiteboard functionality in online learning environments such as discussion forums, discussion threads, chat rooms, discussion walls, Interactive Study Walls, etc. (collectively referred to as "collaborative online discussion mediums") Example embodiments of features relating to this aspect are illustrated, for example, in FIGS. 6-10.

Figure 9:
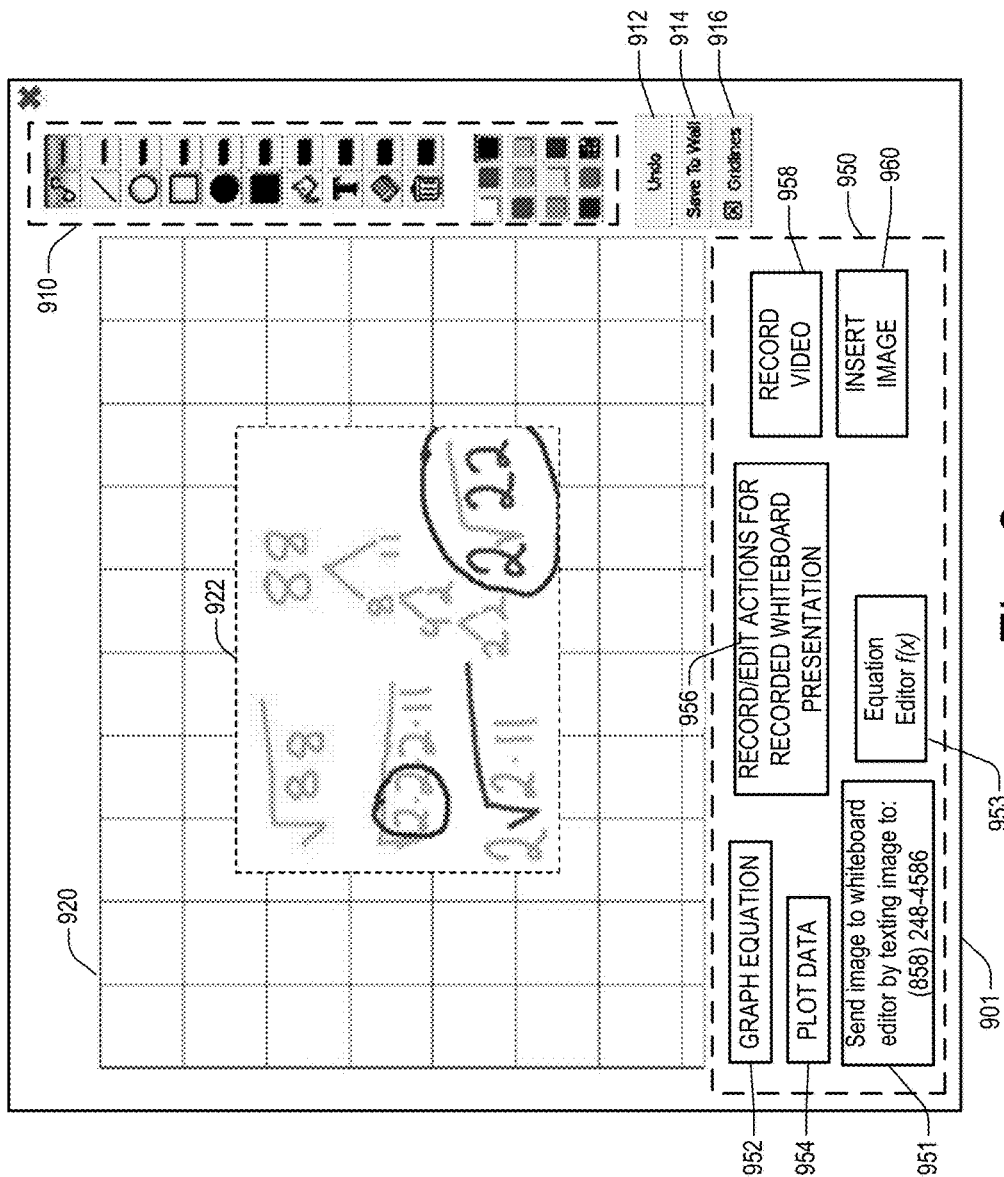

For example, as illustrated in the example embodiment of FIG. 6, Student Interactive Study Wall GUI 601 includes buttons or icons (e.g., Whiteboard Buttons 613, 653) which, when selected by the user, may provide the user with access to various types of whiteboard functionality, as illustrated, for example, in the Interactive Whiteboard GUI 901 of FIG. 9. According to different embodiments, whiteboard functionality may be built directly into the user interface, which, for example, may be configured or designed to as a discussion wall, a discussion board, a discussion thread, a chat box, etc.

FIG. 9 shows an example screenshot of an Interactive Whiteboard GUI 901 in accordance with a specific embodiment. As illustrated in the example embodiment of FIG. 9, the Interactive Whiteboard GUI 901 includes a variety of different whiteboard tools (e.g., 910, 920, 950) for enabling users to perform a variety of activities such as, for example, one or more of the following (or combinations thereof):

Create/draw/edit notes, pictures, and/or diagrams (e.g., via whiteboard editing tools 910).
Create/draw/edit graphs (e.g., via freehand, using pre-set grid lines, etc.).
Create data tables
Plot graphs based upon data points, equations, etc. (e.g., via Graph Equation functionality 952, Plot data functionality 954, etc.).
Capture/upload/edit/annotate images (e.g., via Insert Image functionality 960, via mobile device, email, MMS (951), etc.);
Record/upload/edit videos ((e.g., via Record Video functionality 958, via Record/Edit Actions functionality 956, via mobile device, email, MMS, etc.).
Scan/upload/edit/annotate documents (e.g., via mobile device, email, MMS, reference library pre-populated by the system, etc.).
Record and upload annotated/animated whiteboard diagrams.
Write out complex equations (e.g., via Equation Editor functionality 953).
Draw formulas.
Draw molecular structures, which may or may not be pre-populated by the system.
And/or other types of graphical illustration, editing, annotating operations/activities.

In the specific example embodiment of FIG. 9, it is assumed that a Student user desires to submit a post on the Interactive Study Wall relating to a specific mathematical problem. The Student user accesses an instance of the Interactive Whiteboard GUI 901 to graphically illustrate (e.g., at 922) a portion of steps for solving the mathematical problem. In this particular example, it is assumed that the user accesses the whiteboard drawing tools 910 to draw various equations 922 on the whiteboard canvas 920. The user then intends to post the whiteboard drawing into a new discussion thread which requests other users to review/confirm/comment on whether (or not) the Student user's work/proposed solution is correct. After drawing/annotation is completed, the user can choose to save the edited whiteboard canvas (or whiteboard drawing) and/or post directly to the online discussion thread (e.g., Interactive Study Wall), which causes the whiteboard drawing to be inserted into a new (or existing) discussion thread, as shown, for example, in at 1010 of FIG. 10.

In at least some embodiments, the user may also be provided with the option to add or attach additional commentary/text to the whiteboard drawing before and/or after posting to the discussion thread. The whiteboard drawing (with or without the additional text/commentary, as the user elects) may then be posted directly to the identified discussion thread, with no interruption in the flow of the discussion. Thus, for example, as illustrated in the example embodiment of FIG. 10, the Interactive Study Wall Discussion Thread GUI 1001 shows that the Student user (Alexandra Smith) has posted a new discussion thread which includes the whiteboard drawing 1010 (created via the Interactive Whiteboard GUI 901) and an associated comment/question 1012 (e.g., "Is this right?"). Other online users of the Interactive Study Wall may view the discussion thread post, and (if desired) submit comments/replies (e.g., as indicated, for example, at 1022 and 1024).

According to different embodiments, users may interact with the various discussions or threads of the Interactive Study Wall both synchronously and/or asynchronously. In some embodiments, users may reply to the entire thread generally, or to a comment specifically.

In some embodiments, the OSES whiteboard functionality may be configured or designed to enable or provide different types of whiteboard functionalities and/or privileges to different users who are collaborating together via the Interactive Study Wall and/or other OSES discussions/threads/forums. In some embodiments, at least a portion of such permissions/restrictions in functionalities, editing capabilities, and/or privileges may be dynamically configured by users via one or more Interactive Study Wall GUIs. For example, in some embodiments, some instances of Interactive Whiteboard GUIs may be configured or designed to include functionality for enabling users to configure different levels of permissions/restrictions/privileges for different users (and/or groups of users) with respect to accessing and/or editing posted content at one or more OSES discussions/threads/forums. In some embodiments, some instances of the Interactive Whiteboard GUI may include functionality for configuring different levels of permissions/restrictions/privileges for different users (and/or groups of users). In some embodiments, permissions/restrictions/privileges for accessing and/or editing posted content at one or more OSES discussions/threads/forums may be automatically configured (e.g., by the OSES Server), based on one or more criteria such as, for example, one or more of the following (or combinations thereof):

Class/type of User (e.g., Student, Teacher, Study Expert)
Students' Educational curriculum such as, for example: class/grade/school/state standard/state curriculum information.
Student's profile data such as, for example: User ID, User email address, User IP address, User messaging address, etc.
And/or other types of criteria described and/or referenced herein.

For example, in one embodiment, one or more user(s) may be provided with access to editing privileges (e.g., for editing posted images and/or text), while the other users in the discussion may be provided with only viewing privileges (and may be prevented from having access to editing privileges). In some embodiments, one or more user(s) may be granted permissions for allowing the identified user(s) to grant/remove/modify/configure editing privileges for one or more other users. In some embodiments, more than one user (e.g., multiple different users) may be provided with whiteboard editing privileges, and may concurrently (e.g., in real-time) (or asynchronously) draw, annotate and/or edit images, drawings and/or other objects displayed on the whiteboard canvas. In embodiments where multiple users are granted whiteboard editing privileges, visual indicators may be optionally enabled to identify and associate specific edits, annotations, revisions with the respective user(s) who performed such actions/operations.

Figure 11:
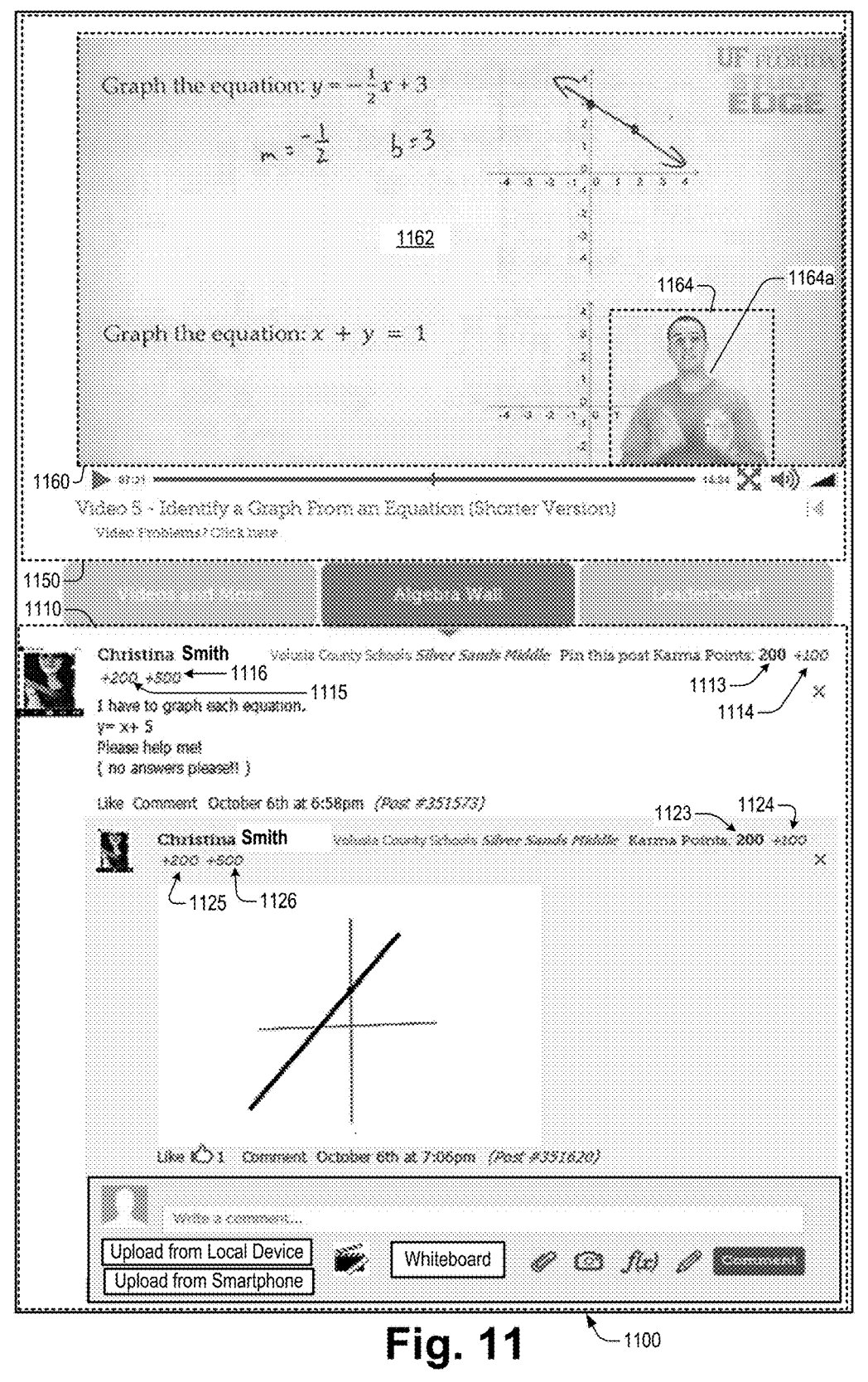

FIG. 11 shows an example screenshot of an Interactive Study Video Discussion Thread GUI 1100 in accordance with a specific embodiment. As illustrated in the example embodiment of FIG. 11, the Interactive Study Video Discussion Thread GUI 1101 may include, but are not limited to, one or more of the following (or combinations thereof):

Video Presentation portion 1110, which may be configured or designed to display one or more educational/tutorial videos relating to specific subject matter selected by the user (e.g., "Identify A Graph From An Equation")

Discussion Thread portion 1112, which may be configured or designed to enable users to post questions and/or comments relating to the video being presented in the Video Presentation portion 1110.

As illustrated in the example embodiment of FIG. 11, a student user has posted (at 1122) an initial question relating to the video tutorial (e.g., "Identify A Graph From An Equation"), requesting assistance in graphing the equation "$y=x+5$". In this particular example, it is assumed that the user subsequently accesses the OSES whiteboard functionality to create a drawing of a graph showing how the equation "$y=x+5$" may be graphed on an X-Y Axis, which is then posted (e.g., at 1132) as a comment/reply in the discussion thread.

Many of today's online educational videos do not capture student attention for long or at all, and are often come across as being impersonal or mechanical. Such educational videos typically have to choose between showing an instructor, speaking to a camera (lecture style), or featuring the problem at hand, with instruction, if any is given, as a voiceover (documentary style). None of these styles is conducive to learning, especially math-specific learning. For example, in educational videos providing math instruction via the documentary style, students may view the problem and equations in order to follow along fully, but are unable to simultaneously observe the visual cues of the presenter.

In some embodiments, the video presentation technology of the Online Social Education System may be configured or designed to provide one or more of the following features, functions, benefits (or combinations thereof):

Ability to watch video and post question to Interactive Study Wall about the video (or segment or portion thereof)
Picture-In-Picture Video Presentation (, e.g., 1164, FIG. 11) provides the ability for video presenter (1164a) to maintain substantially continuous eye contact with camera/user, while concurrently or simultaneously providing the ability for the viewer to observe the presenter's written notes, comments, etc. (e.g., via whiteboard presentation portion 1162).
Online Social Education System PIP functionality preserves eye contact in videos.
Eye Contact is a way to create increased trust and confidence for students, through the use of maintaining eye contact throughout a video
Online Social Education System PIP functionality allows for best of both worlds: students can see problem as instructor is working out/describing problems, while receiving visual cues and support from teacher on side of screen.
In some embodiments, the Online Social Education System PIP feature may be presented as an overlay layer over the whiteboard background 1162. Users/viewers may be provided with capability of dynamically moving the PIP Presenter Box 1164 (within the GUI) in order to view any whiteboard content which may have been obscured by the PIP Presenter Box 1164.
In some embodiments, the Online Social Education System PIP feature may provide users/viewers with the ability to selectively toggle to full face screen (of the presenter 1164a) as needed or desired.
Using the Online Social Education System PIP functionality, the presenter 1164a may maintain continuous eye contact with the camera, and does not need to turn his back to the camera to write on the notes (1162) which is displayed behind the presenter. The presenter is able to write on the notes which is captured by an overhead camera, then displayed to a monitor screen in the eye-line of the presenter and in line with the face-capturing video camera Thus, the tutor can look directly ahead to write on the notes. This gives the effect of the tutor looking directly at the audience when he is writing.

In at least one embodiment, the Online Social Education System may be configured or designed to implement a video presentation technique in which the notes is displayed behind the speaker concurrently while the speaker maintains continuous eye contact with the camera/viewer (e.g., via the PIP Presenter Box 1164).

In one embodiment, one person (e.g., the presenter) maintains the eye contact with the camera while presenting the subject matter, and writing notes in the video tutorial. In such embodiments, the video may be entirely self-directed with no post-editing needed. In at least some embodiments, the presenter's notes may be simultaneously or concurrently displayed in whiteboard background 1162 while the presenter is presenting the material to the viewer via PIP Presenter Box 1164. In some embodiments, in order to enable the presenter to maintain substantially continuous eye contact with the camera, a separate monitor may be placed adjacent to the recording video camera, and may be configured to display (e.g., to the presenter, during the presentation, and in real-time) the content of the whiteboard background 1162.

In one embodiment, 2 people may be used to perform a live video presentation (which may be recorded and displayed as an Interactive Study Wall video tutorial)—one person being the primary presenter (in the video), and the other person (e.g., not shown in the video) being in charge of writing the notes/annotations, etc. which are displayed on the projection behind the presenter.

Figure 12:

In the specific example embodiment of FIG. 12, it is assumed that a first student user (e.g., Sean Smith) posts a question (1212) on the Interactive Study Wall, requesting assistance and how to solve problem 24 in the accompanying image 1222. In this particular example, it is assumed that the image 1222 represents a photo of a page from an algebra workbook, which was captured by the user (e.g., via the user's smartphone) and uploaded to the OSES Server. In on embodiment, the user can upload a photo or image to the Interactive Study Wall directly from the corresponding mobile app. In another embodiment, a user can text or email the photo or image to the OSES Server, and the OSES Server may automatically post the received image/photo to the Interactive Study Wall. In this particular example, it is assumed that a second user (e.g., Jayansh Smith) accesses the OSES whiteboard functionality to create a graphical drawing of an annotated number line showing how problem 24 may be graphed, and then posts the graphical drawing (1232) as a comment/reply in the discussion thread.

Figure 13:
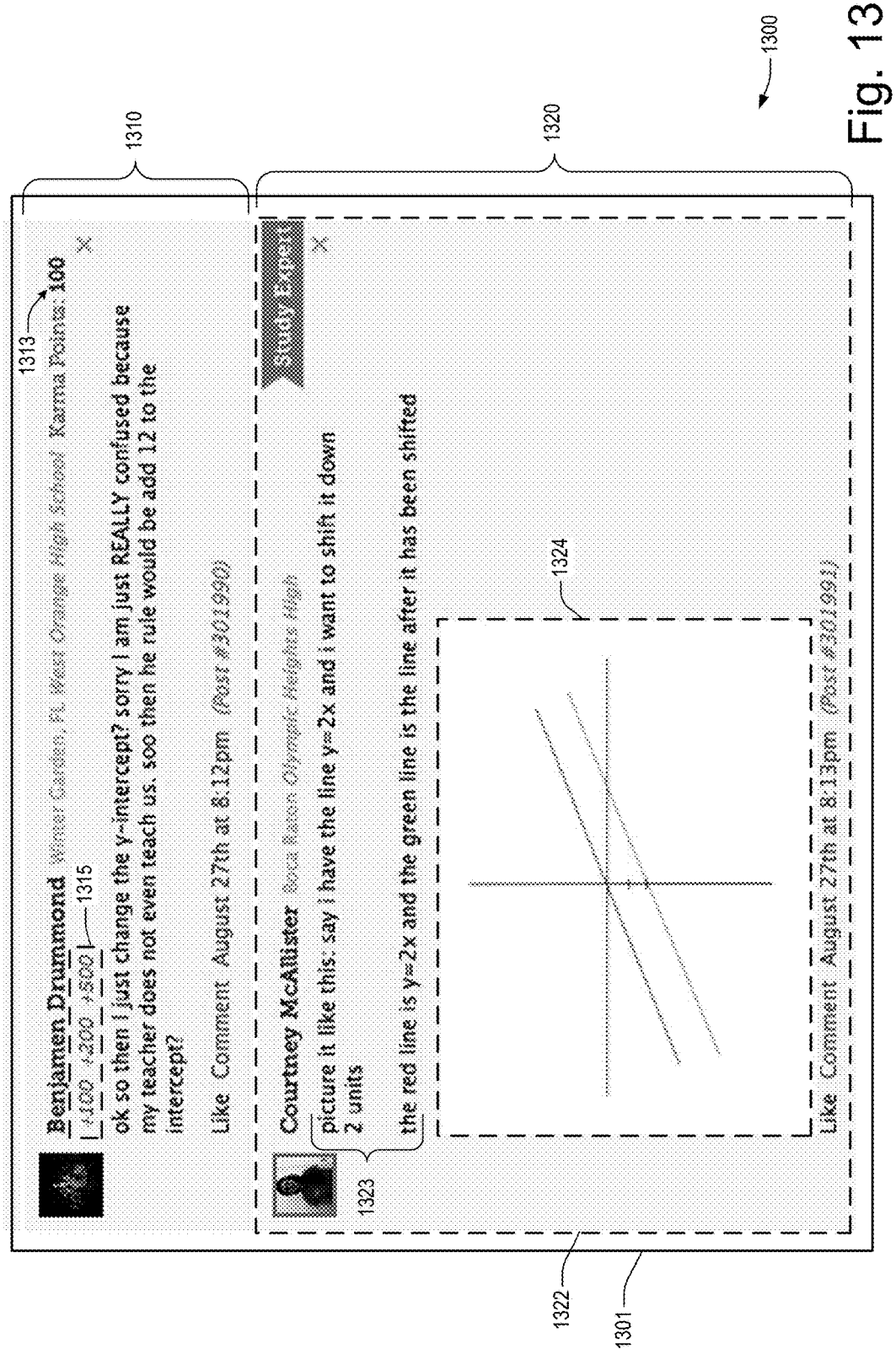

FIG. 13 shows an example screenshot of an Interactive Study Wall GUI 1300 in accordance with a specific embodiment. As illustrated in the example embodiment of FIG. 13, the Interactive Study Wall GUI 1300 may be configured or designed to include functionality for enabling whiteboard graphs and drawings to be posted as part of a user's posted reply/comment.

Interactive Study Wall Filtering Functionality

As described above, at least some Online Social Education System(s) may be configured, designed to provide Interactive Study Wall Filtering Functionality for enabling personalization of users' Interactive Study Wall interactions, such as, for example, filtering posts to specific students (e.g. based on level of student, student's district, school, course enrollment, etc.). In some embodiments, filtering personalization for one or more students/users may be based, at least partially, on one or more of the following criteria (or combinations thereof):

- posts for which a student/user has flagged as being of interest (e.g., user has clicked on "like" button);
- posts with which a student/user has actively engaged/interacted;
- student performance (e.g., how well student performs on practice tools);
- student inputs/self-assessment;
- tags/classifications associated with one or more Interactive Study Wall posts (e.g., high difficulty, medium difficulty, low difficulty, geometry, algebra, fractions, etc.)

Figure 14:

FIG. 14 shows an example screenshot of a Student Interactive Study Wall GUI 1400 in accordance with a specific embodiment. As illustrated in the example embodiment of FIG. 14, the OSES Server may be configured or designed to present a filtered Student Interactive Study Wall GUI 1400 which has been customized and/or personalized to display Interactive Study Wall posts which are determined by the system to be relevant to the user (student) who is viewing the Student Interactive Study Wall GUI 1400. The Interactive Study Wall dynamic filtering functionality enables personalization of a user's Interactive Study Wall interactions, such as, for example, filtering posts to specific students (e.g. based on level of student, student's district, school, course enrollment, etc.).

Various features relating to Personalization on of Wall/Adaptive Learning/Interactive Discussion Forums may include, but are not limited to, one or more of the following (or combinations thereof):

- Discussion boards may be automatically and dynamically personalized dependent on the needs and/or interests of user/viewer.
- Automated Adaptive Learning and Personalization of User's Interactive Study Wall. In at least one embodiment, this may include showing specific posts to specific students (e.g., based on level of student, student's district, school, course enrollment, etc.). In some embodiments the automated adaptive learning and personalization of a user's Interactive Study Wall may be based, at least partially, posts which the user has "liked". In this way, the Online Social Education System is able to dynamically learn what subject matter a student like, and may dynamically learn or determine the educational curriculum levels: (1) in which the student has demonstrated an adequate understanding or proficiency of specific subject matter, and (2) in which the student has not yet demonstrated an adequate understanding or proficiency of specific subject matter. For example, in one embodiment, the Online Social Education System may evaluate the student based on his or her performance on practice tool or test, and may use the evaluation results to dynamically select, modify, and/or filter selected posts which are displayed on the user's personalized Interactive Study Wall. For example, if the Online Social Education System determines that a given user is less proficient in nonlinear functions, the system may dynamically filter the posts displayed on the user's Interactive Study Wall to cause more posts relating to nonlinear functions to be displayed on the user's Interactive Study Wall.

In some embodiments, may also be based on "pre-test" that asks students to self-assess their confidence level on given problems. In some embodiments, may also be based on "self-assessment" such as, for example, student checking off what they understand/don't understand.

Interactive Study Wall users can mark posts as "high/medium/low" to identify the perceived level of difficulty or complexity with a given post, which may be shared with other users, and may also be utilized by the Online Social Education System.

In this way, the Online Social Education System may improve some aspects of students' academic performance and, may create a sense of connectedness that promotes active learning.

Although other social networks may provide features for enabling users to "like" selected posts, one important distinction between such social networks and the Online Social Education System is that, in the Online Social Education System, the user's interests and needs are continually shifting and changing as the user continues to learn and digest new educational curriculum. For example, if a user "likes" a baking-related post on Facebook, Facebook system may show the user more posts about baking, and it is likely that the user will probably still like baking 3 months later. In contrast, a student user of the Interactive Study Wall may "like" a post relating to algebraic equations one month (e.g., while the student is studying algebraic equations in class), but may no longer be interested in viewing posts relating to algebraic equations three months later, for example, because the student has moved on to studying other subject matter. Accordingly, the Online Social Education System is configured or designed to take into account that the student users are continually learning, and are moving through different curriculum in their classrooms. In this way, the Online Social Education System is able to provide dynamically changing, personalized content for each respective user or groups of users (e.g., of a given classroom, grade, etc.) which is substantially relevant to the specific curriculum which the user is currently studying, and relevant to the current needs and interests of the user. For example:

Students mastering certain topics—posts relating to those topics are filtered out from the user's Interactive Study Wall "feed".

Students identified as having issues with certain topic—posts relating to those topics are included in the user's the user's Interactive Study Wall "feed".

Students identified as having similar "Learning Profiles" may view posts from similar learning profile students.

Students, teachers, and/or other users across different geographic regions may use the Interactive Study Wall to collaborate with each other, and the Interactive Study Wall may be configured or designed to automatically and/or dynamically filter posts displayed on each respective user's Interactive Study Wall "Feed" so that only relevant and/or appropriate posts are displayed to each respective user, based on various criteria such as, for example, one or more of the following (or combinations thereof):

class;
grade level;
school;
teacher;
school district;
geographic region;
user experience level (e.g., novice vs. advanced user);
user's current education curriculum;
etc.

In at least some embodiments, Interactive Study Wall may also provide functionality for enabling users to define or configure various filtering rules and/or filtering parameters.

In at least some embodiments, Interactive Study Wall may also provide functionality for enabling users to search for key words of post.

In at least some embodiments, Interactive Study Wall may also provide functionality for recommending to a given user one or more video tutorials, where such recommendations may be based, at least partially upon the subject matter or relevancy of posts which have been (or are being) viewed by that user.

Figure 15:
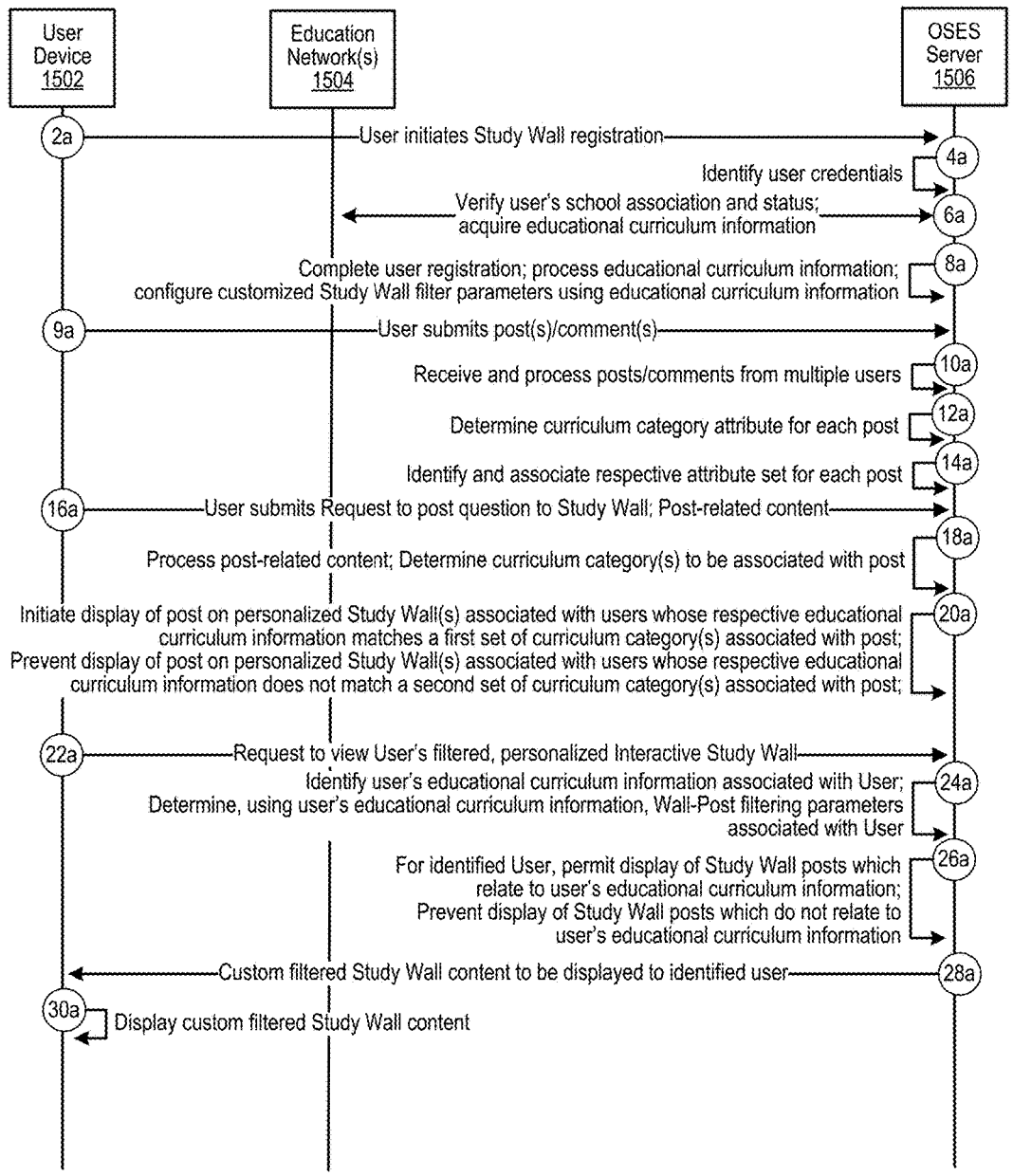
FIG. 15 illustrates an example interaction diagrams describing various processes, actions, and/or operations which may be implemented in connection with the various features and aspects of the Online Social Education System(s) described herein.

FIG. 15 shows a specific example embodiment of an interaction diagram between various systems/devices, which may be utilized for implementing various aspects described herein. In at least one embodiment, the interaction diagram of FIG. 15 illustrates one example embodiment of the various interactions which may be initiated and/or performed in connection with the "Message-to-Post" features described herein.

According to different embodiments, at least a portion of the various types of Online Social Education functions, operations, actions, and/or other features provided by the Online Social Education Procedure of FIG. 15 may be implemented at one or more client systems(s), at one or more server systems (s), and/or combinations thereof.

In at least one embodiment, one or more of the Online Social Education procedure(s) described herein (e.g., including those illustrated in FIG. 15) may be operable to utilize and/or generate various different types of data and/or other types of information when performing specific tasks and/or operations. This may include, for example, input data/information and/or output data/information. For example, in at least one embodiment, the Online Social Education procedure(s) may be operable to access, process, and/or otherwise utilize information from one or more different types of sources, such as, for example, one or more local and/or remote memories, devices and/or systems. Additionally, in at least one embodiment, the Online Social Education procedure(s) may be operable to generate one or more different types of output data/information, which, for example, may be stored in memory of one or more local and/or remote devices and/or systems. Examples of different types of input data/information and/or output data/information which may be accessed and/or utilized by the Online Social Education procedure(s) may include, but are not limited to, one or more of those described and/or referenced herein.

In at least one embodiment, a given instance of one or more of the Online Social Education procedure(s) may access and/or utilize information from one or more associated databases. In at least one embodiment, at least a portion of the database information may be accessed via communication with one or more local and/or remote memory devices. Examples of different types of data which may be accessed by the Online Social Education procedure(s) may include, but are not limited to, one or more of those described and/or referenced herein.

According to specific embodiments, multiple instances or threads of the Online Social Education procedure(s) may be concurrently implemented and/or initiated via the use of one or more processors and/or other combinations of hardware and/or hardware and software. For example, in at least some embodiments, various aspects, features, and/or functionalities of the Online Social Education procedure(s) may be performed, implemented and/or initiated by one or more of the various systems, components, systems, devices, procedures, processes, etc., described and/or referenced herein.

According to different embodiments, one or more different threads or instances of the Online Social Education procedure(s) may be initiated in response to detection of one or more conditions or events satisfying one or more different types of minimum threshold criteria for triggering initiation of at least one instance of the Online Social Education procedure(s). Various examples of conditions or events which may trigger initiation and/or implementation of one or more different threads or instances of the Online Social Education procedure(s) may include, but are not limited to, one or more of those described and/or referenced herein.

According to different embodiments, one or more different threads or instances of the Online Social Education procedure(s) may be initiated and/or implemented manually, automatically, statically, dynamically, concurrently, and/or combinations thereof. Additionally, different instances and/or embodiments of the Online Social Education procedure(s) may be initiated at one or more different time intervals (e.g., during a specific time interval, at regular periodic intervals, at irregular periodic intervals, upon demand, etc.).

In at least one embodiment, initial configuration of one or more instances of the Online Social Education procedure(s) may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the Online Social Education procedure may correspond to and/or may be derived from the input data/information.

In the specific example embodiment of FIG. 15, it is assumed at 2a that a User initiates Interactive Study Wall registration with the OSES Server 1506.

As shown at 4a, the OSES Server may identify user credentials.

As shown at 6a, the OSES Server may use the user's credentials to verify the identified user's school association and status with a remote Education Network 1504, and acquire information relating to the user's educational curriculum. According to different embodiments, examples of educational curriculum information may include, but are not limited to, one or more of the following (or combinations thereof):

Class curriculum information
Grade curriculum information
School curriculum information
District curriculum information
Regional curriculum information
State curriculum information;
Federal curriculum information;
User ID;
User email address;
User IP address;
User messaging address,
Etc.

As shown at 8a, the OSES Server may complete the user registration procedures, process the user's educational curriculum information, and configure customized Study Wall filter parameters. In at least one embodiment, the customized Study Wall filter parameters may be used by the OSES Server to dynamically display a filtered Student Interactive Study Wall GUI which is customized and/or personalized to display Interactive Study Wall posts which are determined to be relevant to the user's associated educational curriculum information.

As shown at 9a, it is assumed that the User submits post(s)/comment(s) to the Interactive Study Wall. Additionally, it is assumed in this example, that other users of the Interactive Study Wall submit post(s)/comment(s) to the Interactive Study Wall.

As shown at 10a, the OSES Server may receive and process posts/comments from multiple different users.

As shown at 12a, the OSES Server may analyze each received post/comment in order to determine and/or assign one or more curriculum category attributes for each post. In at least one embodiment, the OSES Server may parse the content of a given post in order to identify or determine the primary topic(s) and/or subject matter of that post. In at least one embodiment, the assigned curriculum category attributes for a given post may be selected based upon the degree of relatedness or relevancy between a given curriculum category attribute and the identified topics and/or subject matter of a given post.

As shown at 14a, the OSES Server may identify and associate a respective attribute set for each post. Attribute set may include:

User ID
School District ID
State ID
Curriculum category
Difficulty level
and/or other types of criteria described and/or referenced herein.

As shown at 16a, it is assumed that the User submits a request to post a question to the Interactive Study Wall, which includes a first portion of content ("Post-related content").

As shown at 18a, the OSES Server may process the post-related content, and determine one or more curriculum category(s) to be associated with the user's post.

As shown at 20a, the OSES Server may initiate and/or perform one or more activities including, for example:

initiating display of the user's post on filtered Interactive Study Wall GUIs associated with a first groups of users whose respective educational curriculum information matches a first set of curriculum category(s) associated with the user's post; and preventing display of the user's post on other filtered Interactive Study Wall GUIs associated with a second group of users whose respective educational curriculum information does not match a second set of curriculum category(s) (or which does not match any of the curriculum category(s)) associated with the user's post.

As shown at 22a, it is assumed that the User submits a request to view his/her filtered, personalized Interactive Study Wall.

As shown at 24a, the OSES Server may identify the educational curriculum information associated with the User, and determine, using user's educational curriculum information, User-specific Interactive Study Wall filter parameters which may be used by the OSES Server to dynamically display a filtered Student Interactive Study Wall GUI which is customized and/or personalized to display Interactive Study Wall posts which are determined to be relevant to the User's associated educational curriculum information.

As shown at 26a, the OSES Server may initiate and/or perform one or more activities including, for example:
- apply the User-specific Interactive Study Wall filter parameters to thereby permit display of Interactive Study Wall posts (e.g., submitted by other users) which are related to (and/or relevant to) the User's associated educational curriculum information;
- apply the User-specific Interactive Study Wall filter parameters to thereby prevent display of Interactive Study Wall posts (e.g., submitted by other users) which are not related to (and/or not relevant to) the User's associated educational curriculum information.

As shown at 28a, the OSES Server may send custom filtered Interactive Study Wall content to be displayed to identified user.

As shown at 30a, the custom filtered Study Wall content may be displayed at the User's system (e.g., via a Student Interactive Study Wall GUI).

Figure 16:
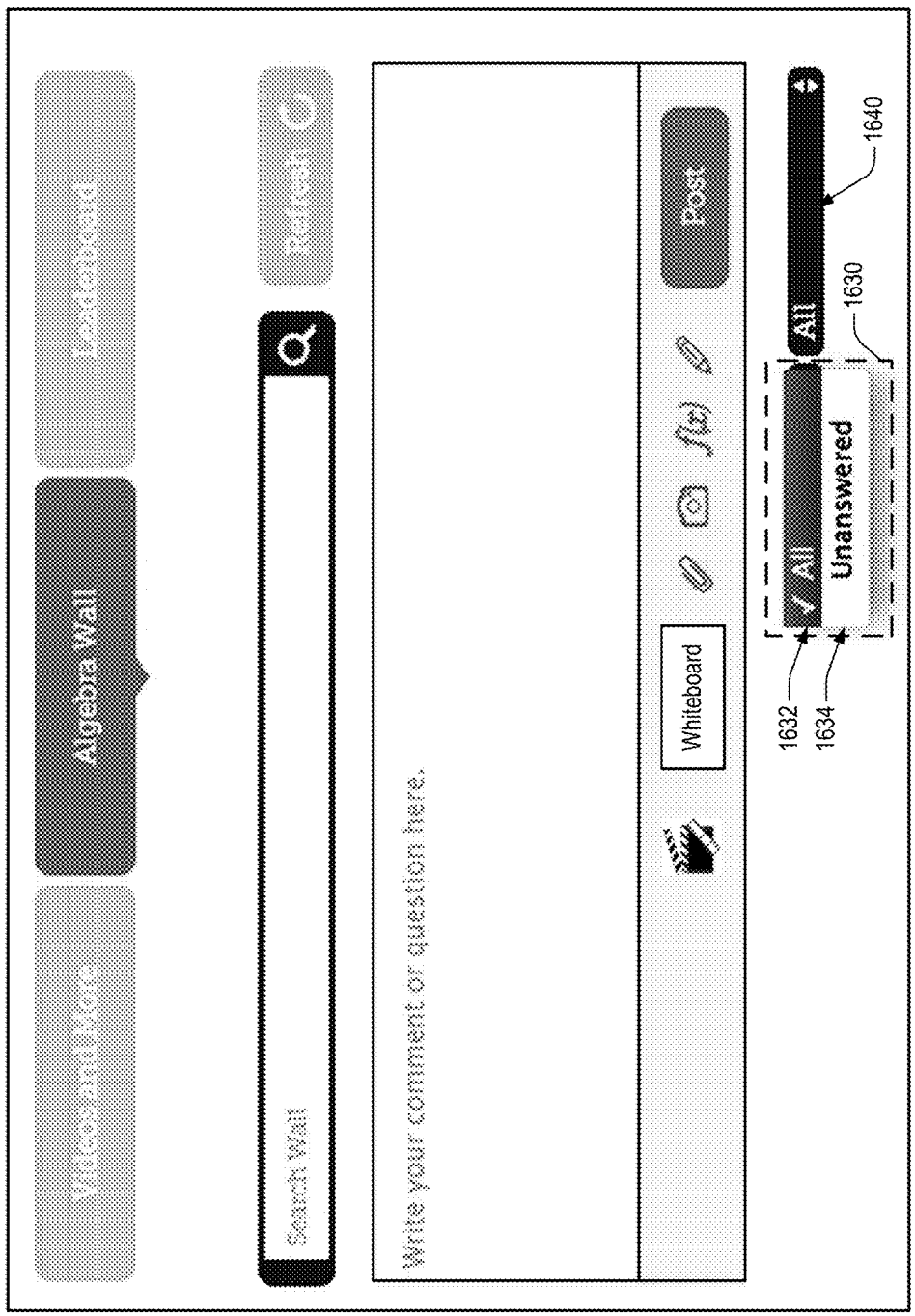

FIG. 16 shows an example screenshot of an Interactive Study Wall GUI 1601 in accordance with a specific embodiment. In at least some embodiments, it may be preferable that each post to the Interactive Study Wall be reviewed, commented on, and/or answered by a Study Expert (or other Interactive Study Wall moderator). To facilitate this, one or more Interactive Study Wall GUIs may be configured or designed to include various types of post filtering functionality. An example of one type of post filtering functionality is illustrated FIG. 16.

As illustrated in the example embodiment of FIG. 16, the Interactive Study Wall GUI 1600 may be configured or designed to include additional filtering functionality (e.g., 1630) for enabling a viewing user to selectively display:
- only a portion of Interactive Study Wall posts which are currently identified by the OSES Server as being "unanswered"; or
- Interactive Study Wall posts which are currently identified by the OSES Server as being either "answered" or "unanswered".
- This allows Study Experts to more effectively moderate the wall, and helps to ensure that all posts are answered or responded to by at least one Study Expert. It also adds the essential human component to the Interactive Study Wall.

As illustrated in the example embodiment of FIG. 16, the Interactive Study Wall GUI 1601 includes a post filtering selection menu (e.g., 1630) which may be configured or designed to enable Interactive Study Wall users (e.g., Study Experts) to display only "unanswered threads". In one embodiment, an "unanswered" thread may correspond to an Interactive Study Wall thread which has a current status (e.g., as identified by the OSES Server) of being "unanswered" or "open". In one embodiment, an "answered" or "closed" thread may correspond to an Interactive Study Wall thread which has a current status (e.g., as identified by the OSES Server) as being "answered" or "closed".

In at least one embodiment, the status of an Interactive Study Wall discussion thread may be determined to be "unanswered" until at least one of the following events occurs: (i) a Study Expert is the last user to post a comment on that discussion thread (e.g., commenting "Good job, this is correct!" or some variation thereof); or (ii) a Study Expert "likes" the last posted comment of the discussion thread. For example, if a Study Experts likes the last post on a thread (e.g., which corresponds to a comment posted by another student user), that thread may be considered "closed". In this way, Study Experts are able to quickly and easily mark threads as being "closed". This allows Study Experts to move the thread off their queue of posts to answer.

In some embodiments, a "closed" or "answered" discussion thread may be automatically reopened (e.g., status of discussion thread automatically changed to "open" or "unanswered") if a user posts a subsequent comment to that discussion thread.

The "unanswered" thread filtering functionality enables Study Experts (and/or other users) to easily view only Interactive Study Wall threads which have not yet been identified as being "answered" or "closed". This filtering functionality greatly facilitates the Study Expert in performing his/her duties and allows the human element to be paired with the online forum.

Figure 17:
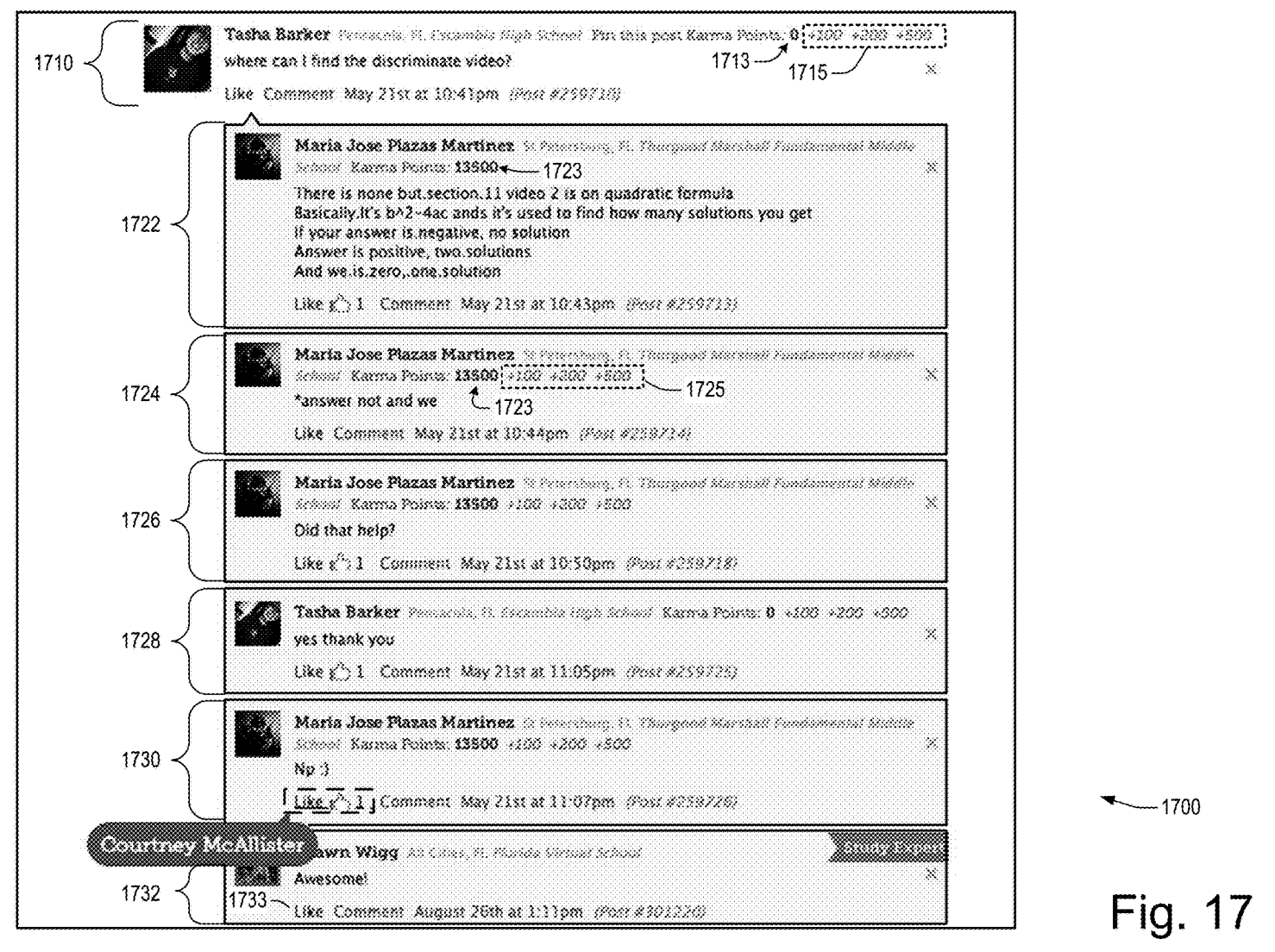

FIG. 17 shows an example screenshot of an Interactive Study Wall GUI 1700 in accordance with a specific embodiment. As illustrated in the example embodiment of FIG. 17, the Interactive Study Wall GUI 1700 may be configured or designed to include functionality for:
- Enabling a viewing user to "like" one or more posted questions and/or comments.
- Enabling a viewing user view information relating to identities of one or more user(s) who "liked" one or more of the posted question(s) and/or comment(s).

Figure 18:
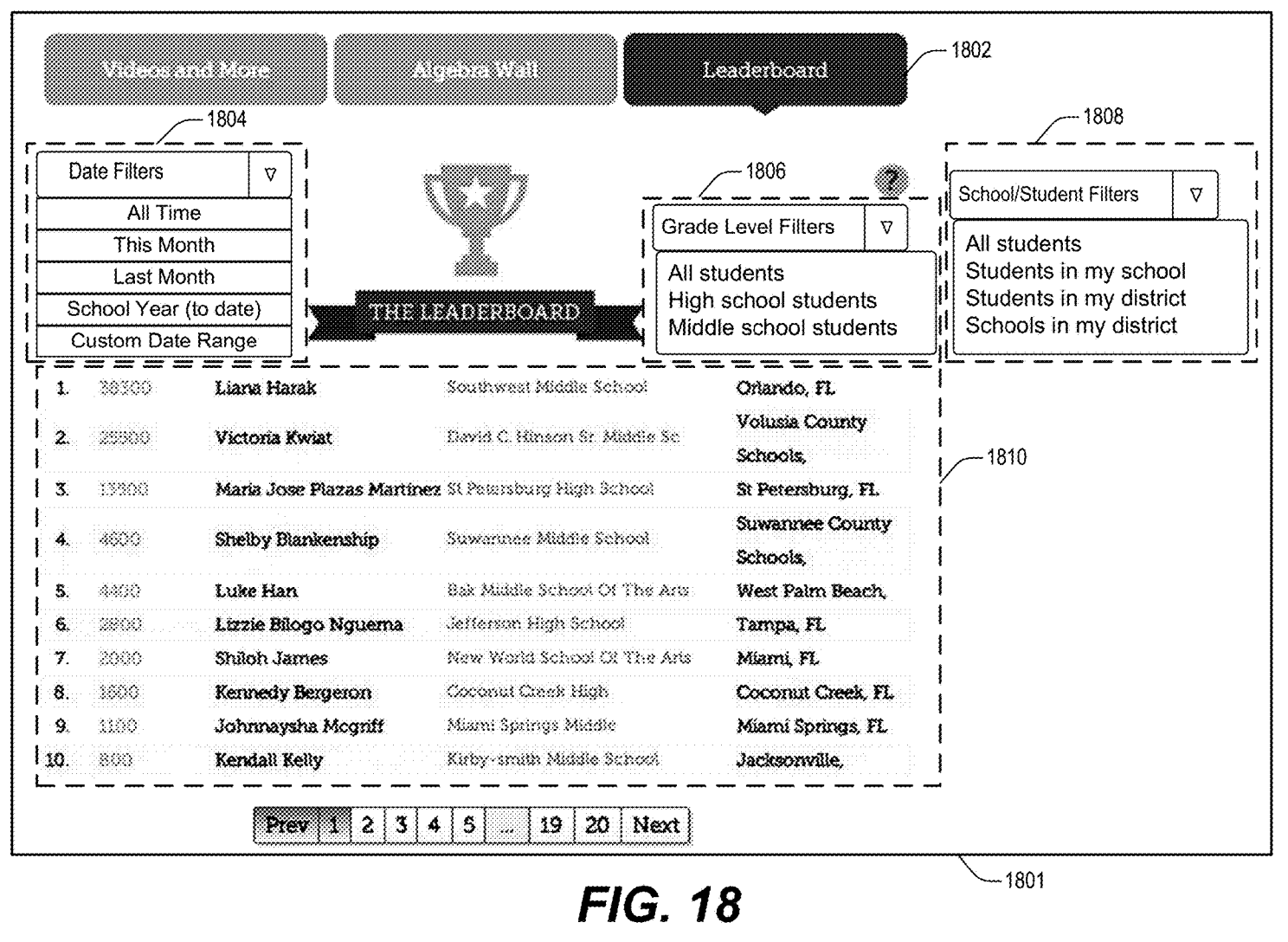

FIG. 18 shows an example screenshot of an Interactive Study Wall Leaderboard GUI 1801 in accordance with a specific embodiment. As illustrated in the example embodiment of FIG. 18, the Interactive Study Wall Leaderboard GUI 1801 may be configured or designed to include:
- Functionality for enabling users to view Interactive Study Wall Leaderboard rankings/standings 1810.
- Filtering functionality 1804, 1806, 1808 for enabling users to configure and apply various types of filtering mechanisms for causing the display of filtered Interactive Study Wall Leaderboard rankings/standings. Examples of such filtering functionality may include, for example:
- Date related filters 1804,
- Grade level related filters 1806,
- School/Student related filters 1808
- and/or other types of filters described and/or referenced herein.

FIG. 19 shows an example screenshot of an Interactive Study Wall Tagging GUI 1901 in accordance with a specific embodiment. As illustrated in the example embodiment of FIG. 19, the Interactive Study Wall Tagging GUI 1901 may be configured or designed to include functionality for:
- presenting different types of tag suggestions to users; and
- enabling users to selectively assign one or more tags to a given posted question, posted comment, posted discussion thread, and/or other types of posted content.

Figure 20:
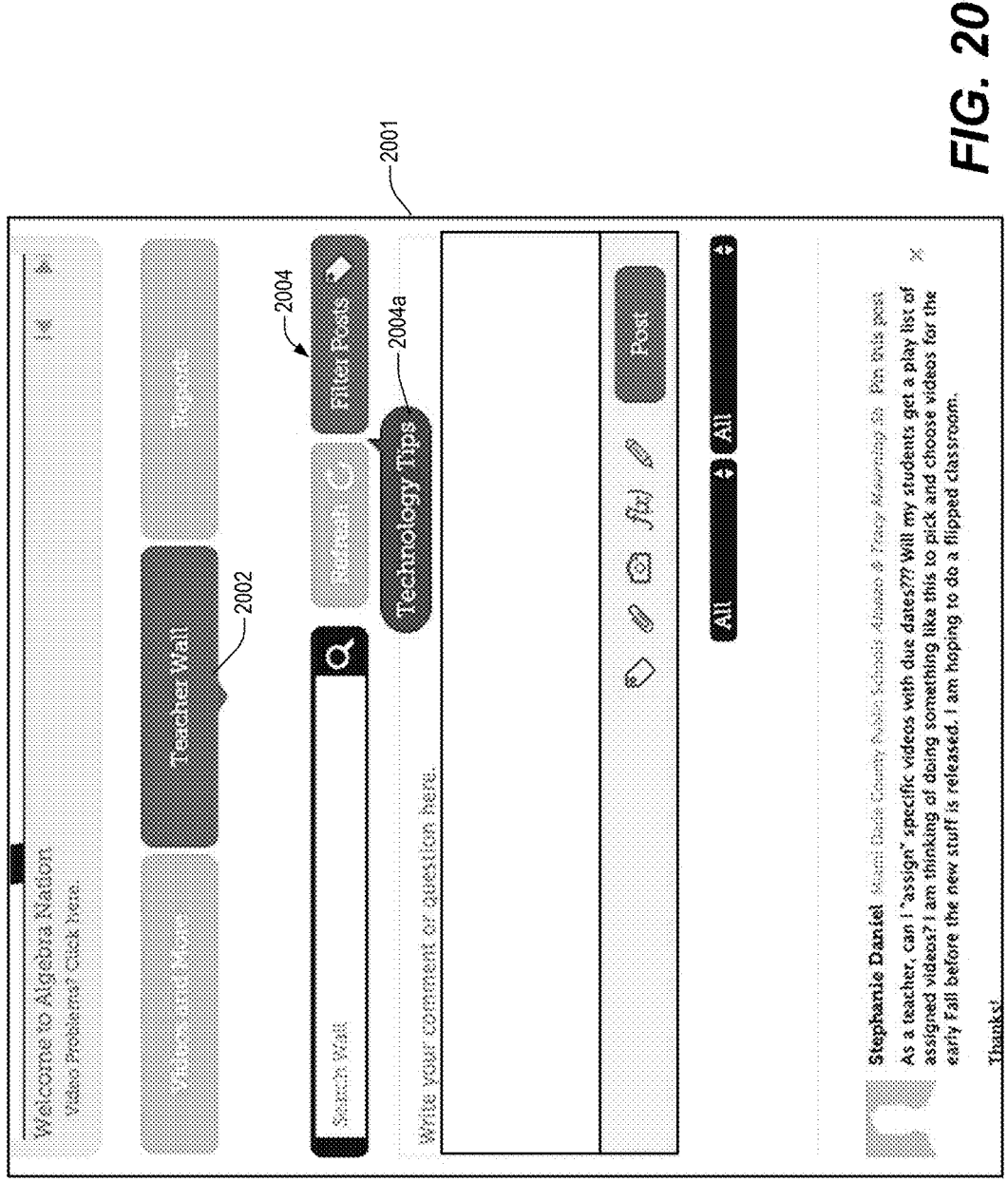

FIG. 20 shows an example screenshot of an Interactive Study Wall GUI 2001 in accordance with a specific embodiment. As illustrated in the example embodiment of FIG. 20, the Interactive Study Wall GUI 2001 may be configured or designed to include functionality for:
- enabling a user to initiate searches for selected posts which match one or more tag keywords selected by the user;
- enabling a user to selectively define one or more tag filters to thereby filter the display of posts which are displayed on the Interactive Study Wall GUI 2001. In one embodiment, the filtered display of posts will include only a portion of Interactive Study Wall posts having associated tag(s) which match one or more tag keywords specified by the tag filters.

FIG. 21 shows an example screenshot of an Interactive Study Wall Tag Filtering GUI 2101 in accordance with a specific embodiment. As illustrated in the example embodiment of FIG. 21, the Interactive Study Wall Tag Filtering GUI 2101 may be configured or designed to include functionality for:

presenting different types of tag suggestions to users for use in defining one or more tag filters; and enabling a user to selectively define one or more tag filters to thereby filter the display of posts which are displayed on the Interactive Study Wall GUI 2001. In one embodiment, the filtered display of posts will include only a portion of Interactive Study Wall posts having associated tag(s) which match one or more tag keywords selected by the user.

Figure 22:
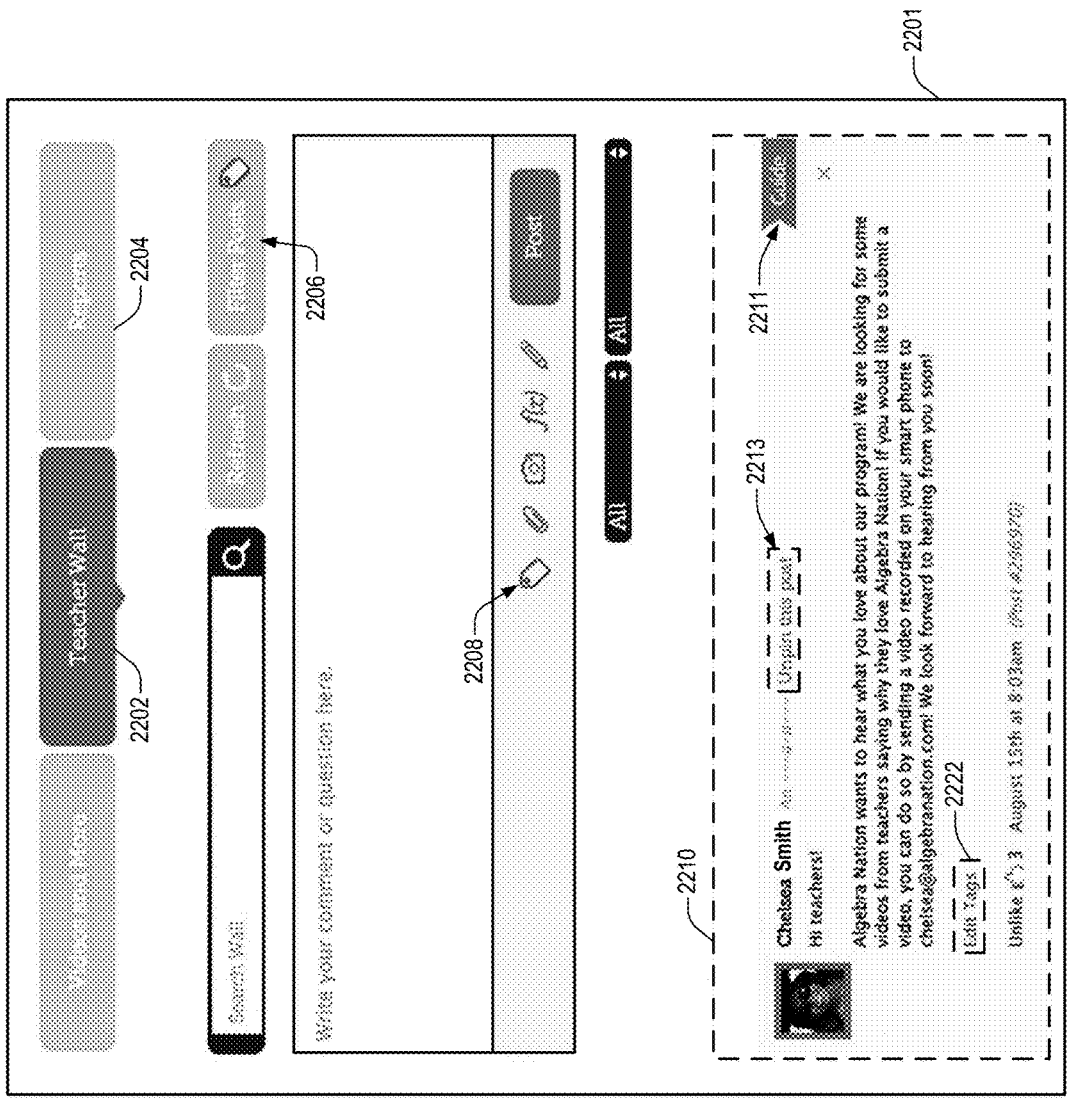

FIG. 22 shows an example screenshot of an Interactive Study Wall GUI 2201 in accordance with a specific embodiment. As illustrated in the example embodiment of FIG. 22, the Interactive Study Wall GUI 2201 may be configured or designed to include functionality for:

enabling a user to selectively pin or unpin an identified post or comment;

enabling a user to edit tag information associated with a given post or comment.

Figure 2:
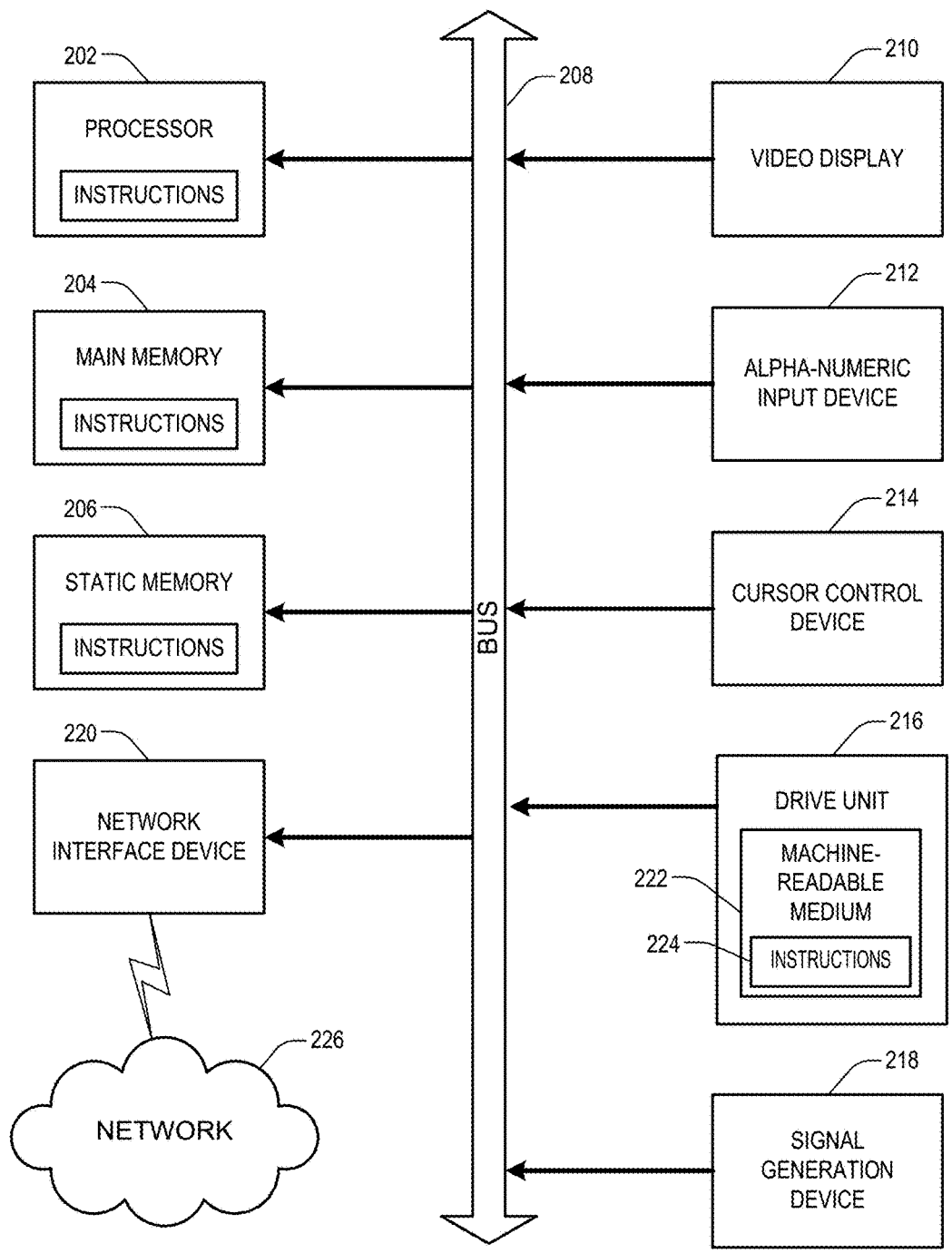
FIG. 2 shows a diagrammatic representation of machine in the exemplary form of a client (or end user) computer system.

FIG. 2 shows a diagrammatic representation of machine in the exemplary form of a client (or end user) computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and annotations/drawings are to be regarded in an illustrative rather than a restrictive sense.

According to various embodiments, Client Computer System 200 may include a variety of components, modules and/or systems for providing various types of functionality. For example, in at least one embodiment, Client Computer System 200 may include a web browser application which is operable to process, execute, and/or support the use of scripts (e.g., JavaScript, AJAX, etc.), Plug-ins, executable code, virtual machines, HTML5 vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

UI Components such as those illustrated, described, and/or referenced herein.

Database Components such as those illustrated, described, and/or referenced herein.

Processing Components such as those illustrated, described, and/or referenced herein.

Other Components which, for example, may include components for facilitating and/or enabling the Client Computer System to perform and/or initiate various types of Online Social Education operations, activities, functions such as those described herein.

Figure 3:
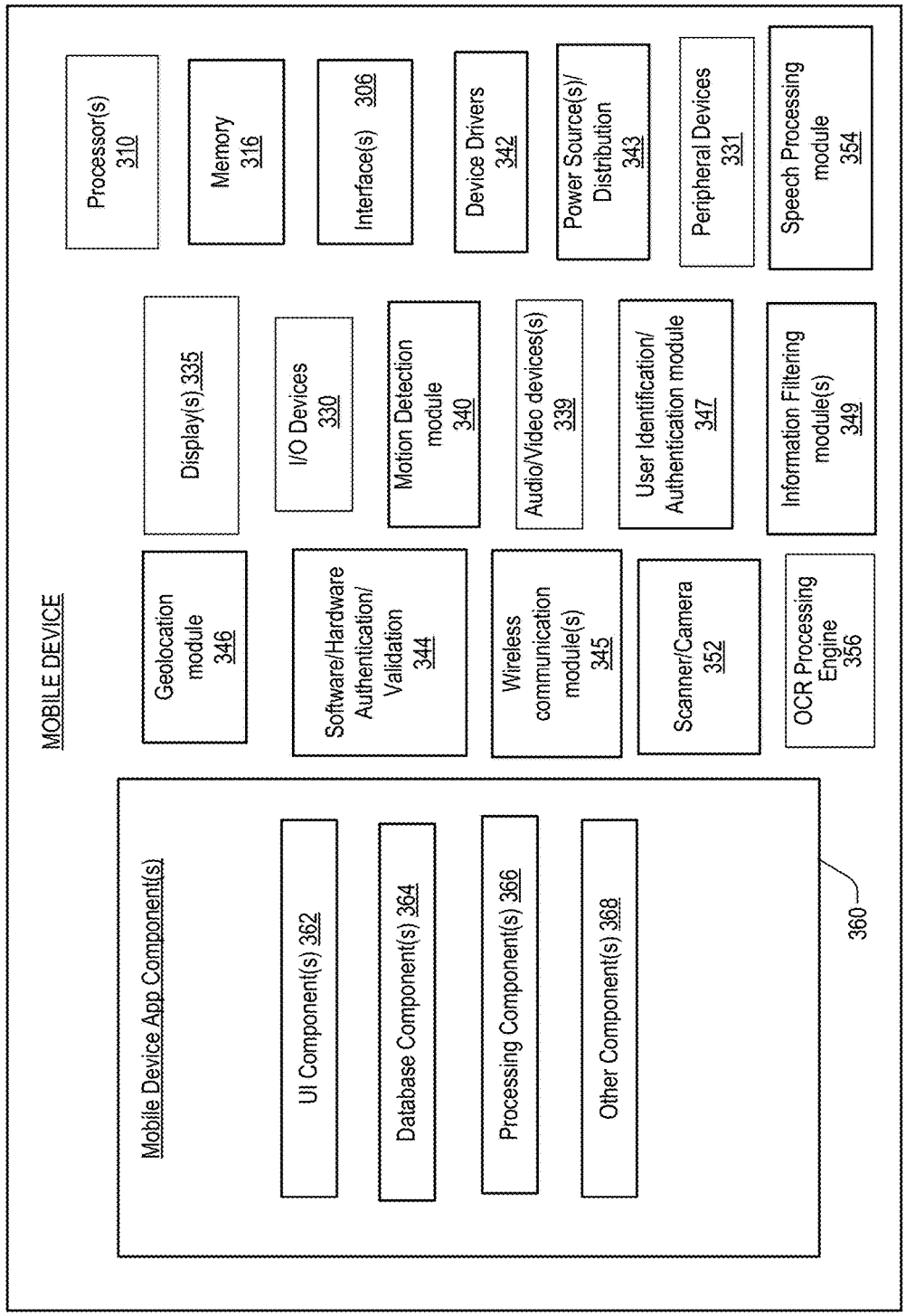
FIG. 3 is a simplified block diagram of an example client system in accordance with a specific embodiment.

FIG. 3 is a simplified block diagram of an example client system 300 in accordance with a specific embodiment. In at least one embodiment, the client system may include Online Social Education Mobile Device App Component(s) which have been configured or designed to provide functionality for enabling or implementing at least a portion of the various Online Social Education techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 310
    Device Drivers 342
    Memory 316
    Interface(s) 306
    Power Source(s)/Distribution 343
    Geolocation module 346
    Display(s) 335
    I/O Devices 330
    Audio/Video devices(s) 339
    Peripheral Devices 331
    Motion Detection module 340
    User Identification/Authentication module 347
    Mobile Device App Component(s) 360
    UI Component(s) 362
    Database Component(s) 364
    Processing Component(s) 366
    Software/Hardware Authentication/Validation 344
    Wireless communication module(s) 345
    Information Filtering module(s) 349
    Speech Processing module 354
    Scanner/Camera 352
    OCR Processing Engine 356
    etc.

As illustrated in the example of FIG. 3 Mobile Device 300 may include a variety of components, modules and/or systems for providing various functionality. For example, as illustrated in FIG. 3, Mobile Device 300 may include Mobile Device Application components (e.g., 360), which, for example, may include, but are not limited to, one or more of the following (or combinations thereof):

UI Components 362 such as those illustrated, described, and/or referenced herein.
    Database Components 364 such as those illustrated, described, and/or referenced herein.
    Processing Components 366 such as those illustrated, described, and/or referenced herein.
    Other Components 368 which, for example, may include components for facilitating and/or enabling the Mobile Device to perform and/or initiate various types of Online Social Education operations, activities, functions such as those described herein.

In at least one embodiment, the Mobile Device Application component(s) may be operable to perform and/or implement various types of Online Social Education/Interactive Study Wall functions, operations, actions, and/or other features such as, for example, one or more of those described and/or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, etc. (or combinations thereof) described and/or referenced herein.

According to different embodiments, one or more different threads or instances of the Mobile Device Application component(s) may be initiated in response to detection of one or more conditions or events satisfying one or more different types of minimum threshold criteria for triggering initiation of at least one Online Social Education feature, action or operation of the Mobile Device Application component(s). Various examples of conditions or events which may trigger initiation and/or implementation of one or more different threads or instances of the Mobile Device Application component(s) may include, but are not limited to, one or more types of conditions and/or events described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more different types of data, metadata, and/or other information described and/or referenced herein.

According to different embodiments, Mobile Device 300 may further include, but is not limited to, one or more of the following types of components, modules and/or systems (or combinations thereof):

At least one processor 310. In at least one embodiment, the processor(s) 310 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.
    Memory 316, which, for example, may include volatile memory (e.g., RAM), non-volatile memory (e.g., disk memory, FLASH memory, EPROMs, etc.), unalterable memory, and/or other types of memory. In at least one implementation, the memory 316 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various Online Social Education techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the Online Social Education techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 306 which, for example, may include wired interfaces and/or wireless interfaces. In at least one implementation, the interface(s) 306 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 342. In at least one implementation, the device driver(s) 342 may include functionality similar to at least a portion of functionality implemented by one or more computer system driver devices such as those described herein and/or generally known to one having ordinary skill in the art.

At least one power source (and/or power distribution source) 343. In at least one implementation, the power source may include at least one mobile power source (e.g., battery) for allowing the client system to operate in a wireless and/or mobile environment. For example, in one implementation, the power source 343 may be implemented using a rechargeable, thin-film type battery. Further, in embodiments where it is desirable for the device to be flexible, the power source 343 may be designed to be flexible.

Geolocation module 346 which, for example, may be configured or designed to acquire geolocation information from remote sources and use the acquired geolocation information to determine information relating to a relative and/or absolute position of the client system.

Motion detection component 340 for detecting motion or movement of the client system and/or for detecting motion, movement, gestures and/or other input data from user. In at least one embodiment, the motion detection component 340 may include one or more motion detection sensors such as, for example, MEMS (Micro Electro Mechanical System) accelerometers, that can detect the acceleration and/or other movements of the client system as it is moved by a user.

User Identification/Authentication module 347. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 335. According to various embodiments, such display(s) may be implemented using, for example, LCD display technology, OLED display technology, and/or other types of conventional display technology. In at least one implementation, display(s) 335 may be adapted to be flexible or bendable. Additionally, in at least one embodiment the information displayed on display(s) 335 may utilize e-ink technology (such as that available from E Ink Corporation, Cambridge, Mass.), or other suitable technology for reducing the power consumption of information displayed on the display(s) 335.

One or more user I/O Device(s) 330 such as, for example, keys, buttons, scroll wheels, cursors, touchscreen sensors, audio command interfaces, magnetic strip reader, optical scanner, etc.

Audio/Video device(s) 339 such as, for example, components for recording, editing, and/or displaying audio/visual media which, for example, may include cameras, speakers, microphones, media presentation components, wireless transmitter/receiver devices for enabling wireless audio and/or visual communication between the client system 300 and remote devices (e.g., radios, telephones, computer systems, etc.). For example, in one implementation, the audio system may include componentry for enabling the client system to function as a cell phone or two-way radio device.

Other types of peripheral devices 331 which may be useful to the users of various client systems, such as, for example: PDA functionality; memory card reader(s); fingerprint reader(s); image projection device(s); social networking peripheral component(s); etc.

Information filtering module(s) 349 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 349 may also be adapted to display, in real-time, filtered information to the user based upon a variety of criteria such as, for example, geolocation information, contextual activity information, and/or other types of filtering criteria described and/or referenced herein.

Wireless communication module(s) 345. In one implementation, the wireless communication module 345 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 344 which, for example, may be used for authenticating and/or validating local hardware and/or software components, hardware/software components residing at a remote device, game play information, wager information, user information and/or identity, etc.

Scanner/Camera Component(s) (e.g., 352) which may be configured or designed for use in scanning identifiers and/or other content from other devices and/or objects such as for example: mobile device displays, computer displays, static displays (e.g., printed on tangible mediums), etc.

OCR Processing Engine (e.g., 356) which, for example, may be operable to perform image processing and optical character recognition of images such as those captured by a mobile device camera, for example.

Speech Processing module (e.g., 354) which, for example, may be operable to perform speech recognition, and may be operable to perform speech-to-text conversion.

Etc.

Figure 4:
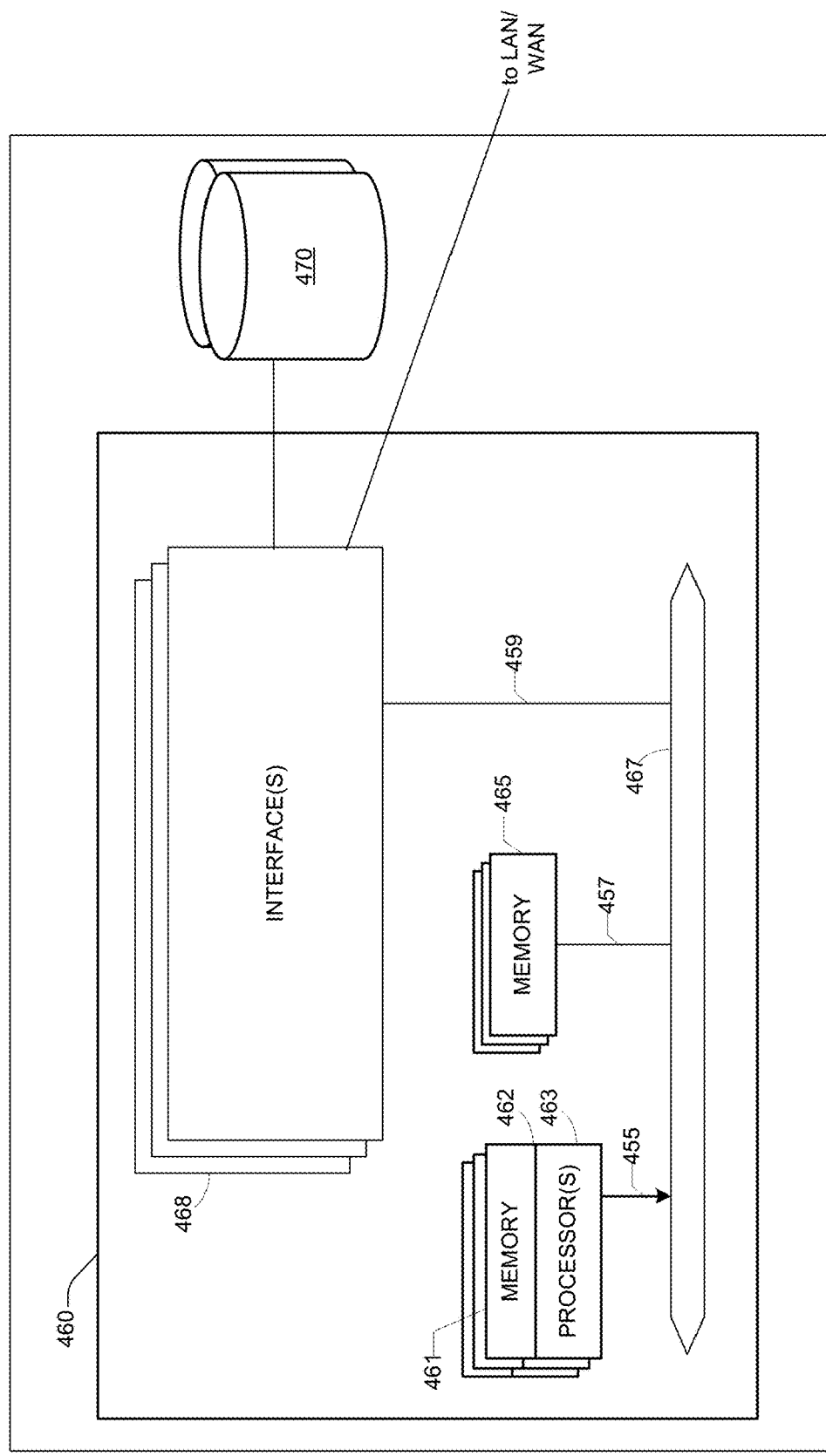
FIG. 4 illustrates an example embodiment of a server system which may be used for implementing various aspects/features described herein.

FIG. 4 illustrates an example embodiment of a server system 480 which may be used for implementing various aspects/features described herein. In at least one embodiment, the OCD server system 480 includes at least one network device 460, and at least one storage device 470 (such as, for example, a direct attached storage device). In one embodiment, server system 480 may be suitable for implementing at least some of the Online Social Education techniques described herein.

In according to one embodiment, network device 460 may include a master central processing unit (CPU) 462, interfaces 468, and a bus 467 (e.g., a PCI bus). When acting under the control of appropriate software or firmware, the CPU 462 may be responsible for implementing specific functions associated with the functions of a desired network device. For example, when configured as a server, the CPU 462 may be responsible for analyzing packets; encapsulating packets; forwarding packets to appropriate network devices; instantiating various types of virtual machines, virtual interfaces, virtual storage volumes, virtual appliances; etc. The CPU 462 preferably accomplishes at least a portion of these functions under the control of software including an operating system (e.g. Linux), and any appropriate system software (such as, for example, AppLogic™ software).

CPU 462 may include one or more processors 463 such as, for example, one or more processors from the AMD, Motorola, Intel and/or MIPS families of microprocessors. In an alternative embodiment, processor 463 may be specially designed hardware for controlling the operations of server system 480. In a specific embodiment, a memory 461 (such as non-volatile RAM and/or ROM) also forms part of CPU 462. However, there may be many different ways in which memory could be coupled to the OSES Server. Memory block 461 may be used for a variety of purposes such as, for example, caching and/or storing data, programming instructions, etc.

The interfaces 468 may be typically provided as interface cards (sometimes referred to as "line cards"). Alternatively, one or more of the interfaces 468 may be provided as on-board interface controllers built into the OSES Server motherboard. Generally, they control the sending and receiving of data packets over the network and sometimes support other peripherals used with the OCD server system 480. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA Interfaces, CDMA2000 interfaces, WCDMA Interfaces, TDMA Interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

In at least one embodiment, some interfaces may be configured or designed to allow the OCD server system 480 to communicate with other network devices associated with various local area network (LANs) and/or wide area networks (WANs). Other interfaces may be configured or designed to allow network device 460 to communicate with one or more direct attached storage device(s) 470.

Although the OSES Server shown in FIG. 4 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 465, which, for example, may include random access memory (RAM)) configured to store data, program instructions for the general-purpose network operations and/or other information relating to the functionality of the various Online Social Education techniques described herein. The program instructions may control the operation of an operating system and/or one or more applications, for example. The memory or memories may also be configured to store data structures, and/or other specific non-program information described herein.

Because such information and program instructions may be employed to implement the OSES Servers/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as optical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 5:
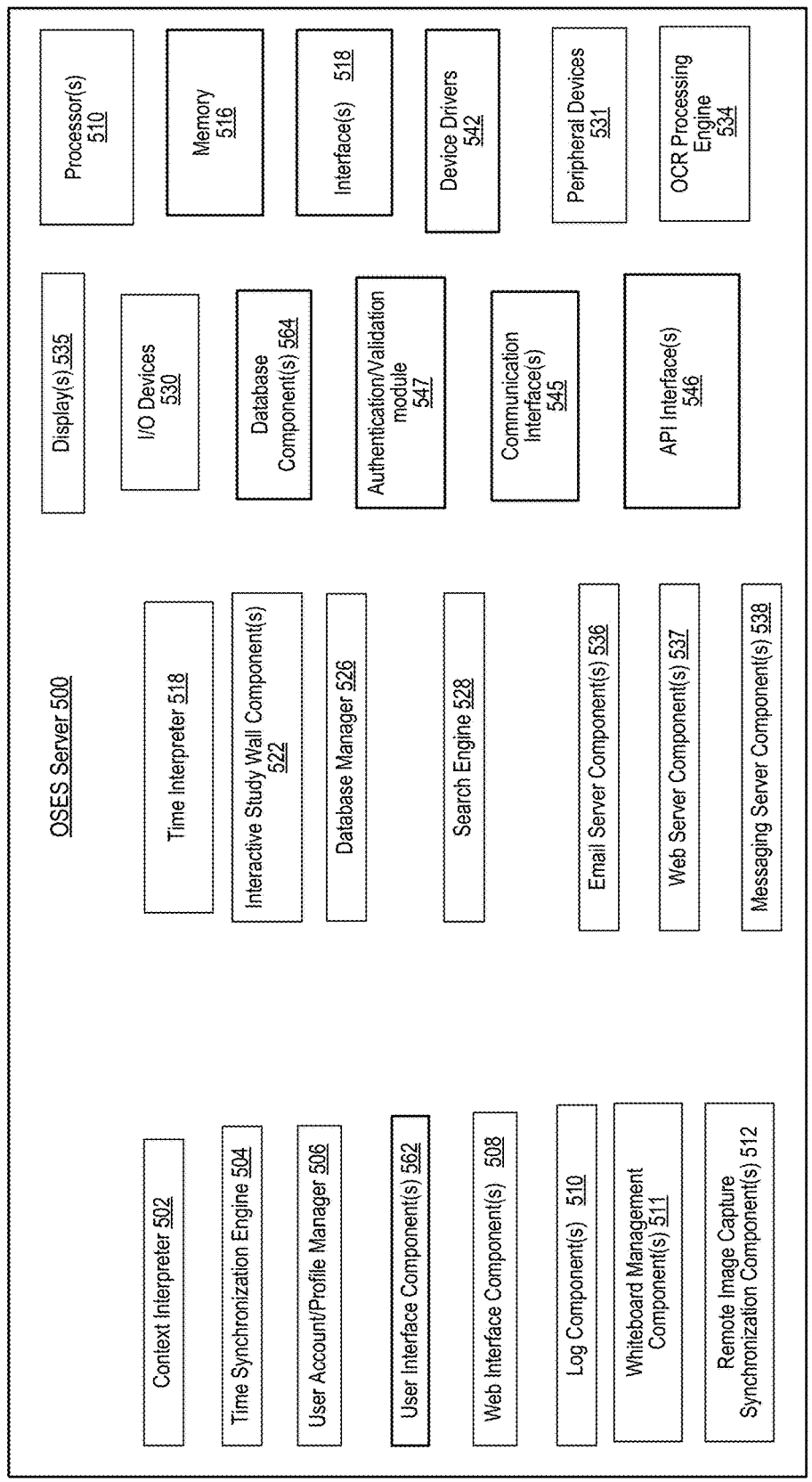
FIG. 5 illustrates an example of a functional block diagram of an Online Social Education System in accordance with a specific embodiment.

FIG. 5 illustrates an example of a functional block diagram of an Online Social Education System in accordance with a specific embodiment.

In at least one embodiment, the Online Social Education System may be operable to perform and/or implement various types of Online Social Education functions, operations, actions, and/or other features, such as, for example, one or more of those described and/or referenced herein.

In at least one embodiment, the Online Social Education System may include a plurality of components operable to perform and/or implement various types of Online Social Education functions, operations, actions, and/or other features such as, for example, one or more of the following (or combinations thereof):

Context Interpreter (e.g., 502) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (or combinations thereof):
 location-based criteria (e.g., geolocation of client device, geolocation of agent device, etc.)
 time-based criteria
 identity of user(s)
 user profile information
 transaction history information
 recent user activities
 proximate business-related criteria (e.g., criteria which may be used to determine whether the client device is currently located at or near a recognized business establishment such as a bank, gas station, restaurant, supermarket, etc.)
 etc.

Time Synchronization Engine (e.g., 504) which, for example, may be operable to manages universal time synchronization (e.g., via NTP and/or GPS)

Search Engine (e.g., 528) which, for example, may be operable to search for transactions, logs, items, accounts, options in the Online Social Education databases Configuration Engine (e.g., 532) which, for example, may be operable to determine and handle configuration of various customized configuration parameters for one or more devices, component(s), system(s), process(es), etc.

Time Interpreter (e.g., 518) which, for example, may be operable to automatically and/or dynamically modify or change identifier activation and expiration time(s) based on various criteria such as, for example, time, location, transaction status, etc.

Authentication/Validation Component(s) (e.g., 547) (password, software/hardware info, SSL certificates) which, for example, may be operable to perform various types of authentication/validation tasks such as, for example, one or more of the following (or combinations thereof):
 verifying/authenticating devices,
 verifying/authenticating users,
 verifying passwords, passcodes, SSL certificates, biometric identification information, and/or other types of security-related information
 verify/validate activation and/or expiration times
 etc.

In one implementation, the Authentication/Validation Component(s) may be adapted to determine and/or authenticate the identity of the current user or client system. For example, in one embodiment, the current user may be required to perform a log in process at the mobile client system in order to access one or more features. In some embodiments, the mobile client system may include biometric security components which may be operable to validate and/or authenticate the identity of a user by reading or scanning The user's biometric information (e.g., fingerprints, face, voice, eye/iris, etc.). In at least one implementation, various security features may be incorporated into the mobile client system to prevent unauthorized users from accessing confidential or sensitive information.

Interactive Study Wall Component(s) (e.g., 522) which, for example, may be operable to perform and/or implement various types of Interactive Study Wall functions, operations, actions, and/or other features, such as, for example, one or more of those described and/or referenced herein.

White Board Management Component(s) (e.g., 511) which, for example, may be operable to perform and/or implement various types of whiteboard functions, operations, actions, and/or other features, such as, for example, one or more of those described and/or referenced herein.

OCR Processing Engine (e.g., 534) which, for example, may be operable to perform image processing and optical character recognition of images such as those captured by a mobile device camera, for example.

Database Manager (e.g., 526) which, for example, may be operable to handle various types of tasks relating to database updating, database management, database access, etc.

Log Component(s) (e.g., 510) which, for example, may be operable to generate and manage transactions history logs, system errors, connections from APIs, etc.

Web Interface Component(s) (e.g., 508) which, for example, may be operable to facilitate and manage communications and transactions with Online Social Education web portal(s).

API Interface(s) (e.g., 546) which, for example, may be operable to facilitate and manage communications and transactions with API Interface(s) to Online Education Server System(s) and/or other system(s)/network(s).

OCR Processing Engine (e.g., 534) which, for example, may be operable to perform image processing and optical character recognition of images such as those captured by a mobile device camera, for example.

At least one processor 510. In at least one embodiment, the processor(s) 510 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 516, which, for example, may include volatile memory (e.g., RAM), non-volatile memory (e.g., disk memory, FLASH memory, EPROMs, etc.), unalterable memory, and/or other types of memory. In at least one implementation, the memory 516 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the Online Social Education System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 518 which, for example, may include wired interfaces and/or wireless interfaces. In at least one implementation, the interface(s) 518 may include functionality similar to at least a portion of functionality implemented by one or more computer system interfaces such as those described herein and/or generally known to one having ordinary skill in the art.

Device driver(s) 542. In at least one implementation, the device driver(s) 542 may include functionality similar to at least a portion of functionality implemented by one or more computer system driver devices such as those described herein and/or generally known to one having ordinary skill in the art.

One or more display(s) 535. According to various embodiments, such display(s) may be implemented using, for example, LCD display technology, OLED display technology, and/or other types of conventional display technology. In at least one implementation, display(s) 535 may be adapted to be flexible or bendable. Additionally, in at least one embodiment the information displayed on display(s) 535 may utilize e-ink technology (such as that available from E Ink Corporation, Cambridge, Mass.), or other suitable technology for reducing the power consumption of information displayed on the display(s) 535.

Email Server Component(s) 536, which, for example, may be configured or designed to provide various functions and operations relating to email activities and communications.

Web Server Component(s) 537, which, for example, may be configured or designed to provide various functions and operations relating to web server activities and communications.

Messaging Server Component(s) 538, which, for example, may be configured or designed to provide various functions and operations relating to text messaging and/or other social network messaging activities and/or communications.

Etc.

OCD Features/Functionality

Although many of the example embodiments and screenshot GUIs described above have been directed to specific embodiments relating to Interactive Study Wall posts, it will be appreciated that many of the Online Social Education System techniques described herein may also be applied to other types of online, collaborative educational environments such as, for example, webinars, audio/video chat rooms, video whiteboards, video conferences, online forums, online presentations, online collaborative tutorial sessions, and the like. For example, as described in greater detail herein, features and functionality relating to the Online Education techniques described herein may be implemented and/or utilized in other types of online, collaborative educational environments including, for example, webinars, audio/video chat rooms, video conferences, online forums, online collaborative tutorial sessions, online presentations, and the like.

For reference purposes, such other online collaborative educational environments may collectively be referred to as Online Collaborative Discussion (OCD) Environments (or OCD Rooms). According to different embodiments, various different types of OCD Rooms may be hosted by the Online Social Education System and/or 3rd party entities (such as, for example, Webex, Adobe Connect, Skype, etc.). Additionally, one or more of the various OCD Rooms may include functionality for providing Whiteboard GUIs, and/or for hosting collaborative whiteboard forums.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

I claim:

1. In an Online Social Education System (OSES) server, a computer-implemented method for facilitating collaborative, online education via a computer network, the method comprising causing at least one processor to execute a plurality of instructions for:

generating a graphical user interface of an interactive wall for use by a student user ("student GUI"), said student GUI including a post posted by said student user on said interactive wall and a total student point value;

displaying said student GUI on at least a computer of said student;

detecting, by said OSES server, that said post is a first post by said student user on said interactive wall;

modifying said student GUI in order to update said total student point value to include a point value based upon said detecting;

displaying said student GUI on at least said student computer;

in response to said updating said total student point value, modifying a moderator graphical user interface used by a moderator user ("moderator GUI") and any other moderator GUI of said interactive wall that includes said post such that said moderator GUI and said any other moderator GUIs do not include any optional point value associated with said post; and displaying said moderator GUI on at least a computer of said moderator, wherein said moderator user and any other moderator user is not able to award points to said student user for said post after said modifying of said moderator GUI.

2. A method as recited in claim 1 wherein only said moderator user and said other moderator users are authorized to award points for said post.

3. A method as recited in claim 1 comprising further causing said at least one processor to execute a plurality of instructions for:

notifying said moderator user of said first post by said student user on said interactive wall.

4. A method as recited in claim 1 further comprising:

providing, by said OSES server, a notification to said moderator user that said first post by said student user has been posted on said interactive wall.

5. In an Online Social Education System (OSES) server, a computer-implemented method for facilitating collaborative, online education via a computer network, the method comprising causing at least one processor to execute a plurality of instructions for:

generating a graphical user interface of an interactive wall for use by a student user ("student GUI"), said student GUI including a post posted by said student user on said interactive wall and a total student point value;

displaying said student GUI on at least a computer of said student;

generating a moderator graphical user interface of said interactive wall for use by a moderator user ("moderator GUI"), said moderator GUI including said post as well as an optional point value associated with said post;

displaying said moderator GUI on at least a computer of said moderator;

receiving an input at said OSES server from said moderator computer indicating a selection of said optional point value on said moderator GUI of said moderator computer;

modifying said student GUI in order to update said total student point value to include said optional point value;

displaying said modified student GUI on at least said student computer;

in response to said updating said total student point value, modifying said moderator GUI and any other moderator GUI of said interactive wall that includes said post in order remove said optional point value from said post; and displaying said modified moderator GUI on at least said moderator computer, wherein said moderator user and any other moderator user is not able to award points to said student user for said post after said modification of said moderator GUI.

6. A method as recited in claim 5 wherein only said moderator user and said other moderator users are authorized to award points for said post.

7. A method as recited in claim 5 wherein said optional point value on said moderator GUI is a numerical value.

8. A method as recited in claim 5 wherein said moderator GUI includes a plurality of numerical optional point values associated with said post.

9. A method as recited in claim 5 further comprising:

providing, by said OSES server, a notification to said moderator user that said post by said student user has been posted on said interactive wall.

* * * * *